(12) United States Patent
Takashima et al.

(10) Patent No.: US 11,888,968 B2
(45) Date of Patent: Jan. 30, 2024

(54) SIGNATURE DEVICE, VERIFICATION DEVICE, SIGNATURE METHOD, VERIFICATION METHOD, AND COMPUTER READABLE MEDIUM

(71) Applicants: Mitsubishi Electric Corporation, Tokyo (JP); NIPPON TELEGRAPH AND TELEPHONE CORPORATION, Tokyo (JP)

(72) Inventors: Katsuyuki Takashima, Tokyo (JP); Tatsuaki Okamoto, Tokyo (JP); Pratish Datta, Tokyo (JP)

(73) Assignees: MITSUBISHI ELECTRIC CORPORATION, Tokyo (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 361 days.

(21) Appl. No.: 17/382,884

(22) Filed: Jul. 22, 2021

(65) Prior Publication Data
US 2021/0359848 A1    Nov. 18, 2021

Related U.S. Application Data

(63) Continuation of application No. PCT/JP2019/047995, filed on Dec. 9, 2019.

(30) Foreign Application Priority Data

Mar. 15, 2019   (JP) ................. 2019-048622

(51) Int. Cl.
*H04L 9/08* (2006.01)
*G06F 17/16* (2006.01)
*H04L 9/32* (2006.01)

(52) U.S. Cl.
CPC ............ *H04L 9/0825* (2013.01); *G06F 17/16* (2013.01); *H04L 9/0861* (2013.01); *H04L 9/3247* (2013.01)

(58) Field of Classification Search
CPC ... H04L 9/0825; H04L 9/0861; H04L 9/3247; G06F 17/16
See application file for complete search history.

(56) References Cited

U.S. PATENT DOCUMENTS 8,510,791 B2 *  8/2013  Boyce ................. H04L 63/1408
                                                                   726/1
9,892,165 B2 *  2/2018  Barber .............. G06F 16/24575
(Continued)

OTHER PUBLICATIONS

Datta et al., "Attribute-Based Signatures for Turing Machines", In Cryptology ePrint Archive: Report 2017/801, Aug. 25, 2017, total 80 pages.

(Continued)

*Primary Examiner* — Viral S Lakhia
(74) *Attorney, Agent, or Firm* — BIRCH, STEWART, KOLASCH & BIRCH, LLP

(57) ABSTRACT

A signature device (30) acquires a signature key $SK(x^\rightarrow)$ in which an attribute vector $x^\rightarrow$ is set over a basis B* of a basis B and the basis B*, which are dual bases in dual vector spaces. The signature device (30) generates a signature sig for a message MSG by setting predicate information of arithmetic branching programs (ABP) for the signature key $SK(x^\rightarrow)$. The signature device (30) outputs the signature sig and the message MSG to a verification device (40).

13 Claims, 13 Drawing Sheets

(56) References Cited

U.S. PATENT DOCUMENTS

| | | | | |
|---|---|---|---|---|
| 9,906,360 | B2* | 2/2018 | Johnson | H04L 9/0631 |
| 2004/0223616 | A1* | 11/2004 | Kocarev | H04L 9/001 |
| | | | | 380/263 |
| 2021/0234676 | A1* | 7/2021 | Takashima | H04L 9/0847 |

OTHER PUBLICATIONS

International Search Report for PCT/JP2019/047995 dated Feb. 18, 2020.

Ishai et al., "Partial Garbling Schemes and Their Applications", In Cryptology ePrint Archive: Report 2014/995, Dec. 12, 2014, total 22 pages.

Ishai et al., "Perfect Constant-Round Secure Computation via Perfect Randomizing Polynomials", In: International Colloquium on Automata, Languages, and Programming, ICALP 2002, pp. 244-256.

Sakai et al., "Attribute-Based Signatures for Unbounded Languages from Standard Assumptions", In Cryptology ePrint Archive: Report 2018/842, Sep. 10, 2018, total 38 pages.

Sakai et al.,"Attribute-Based Signatures for Circuits from Bilinear Map", In: PKC 2016, pp. 283-300.

* cited by examiner

SIGNATURE DEVICE, VERIFICATION DEVICE, SIGNATURE METHOD, VERIFICATION METHOD, AND COMPUTER READABLE MEDIUM

CROSS REFERENCE TO RELATED APPLICATIONS

This application is a Continuation of PCT International Application No. PCT/JP2019/047995, filed on Dec. 9, 2019, which claims priority under 35 U.S.C. 119(a) to Patent Application No. 2019-048622, filed in Japan on Mar. 15, 2019, all of which are hereby expressly incorporated by reference into the present application.

TECHNICAL FIELD

The present invention relates to a signature technique using arithmetic branching programs (ABP).

BACKGROUND ART

Non-Patent Literature 1 describes an attribute-based signature (ABS) scheme for a general predicate determined by a polynomial-sized circuit, a polynomial-time computable Turing machine, and the like.

CITATION LIST

Non-Patent Literature

Non-Patent Literature 1: Y. Sakai, S. Katsumata, N. Attrapadung, G. Hanaoka, Attribute-based signatures for unbounded languages from standard assumptions

SUMMARY OF INVENTION

Technical Problem

However, the scheme described in Non-Patent Literature 1 is highly theoretical, and it is difficult to achieve efficiency that allows actual use.

It is an object of the present invention to allow a practical ABS scheme to be constructed.

Solution to Problem

A signature device according to the present invention includes an acquisition unit to acquire a signature key in which an attribute vector is set over a basis B* of a basis B and the basis B*, which are dual bases in dual vector spaces;

a signature unit to generate a signature for a message by setting predicate information of arithmetic branching programs (ABP) for the signature key acquired by the acquisition unit; and an output unit to output the signature generated by the signature unit and the message.

Advantageous Effects of Invention

In the present invention, a signature is generated by setting a predicate vector of ABP for a signature key in which an attribute vector is set. This allows a practical ABS scheme to be constructed.

DESCRIPTION OF EMBODIMENTS

First Embodiment

Notations

Figure 1:
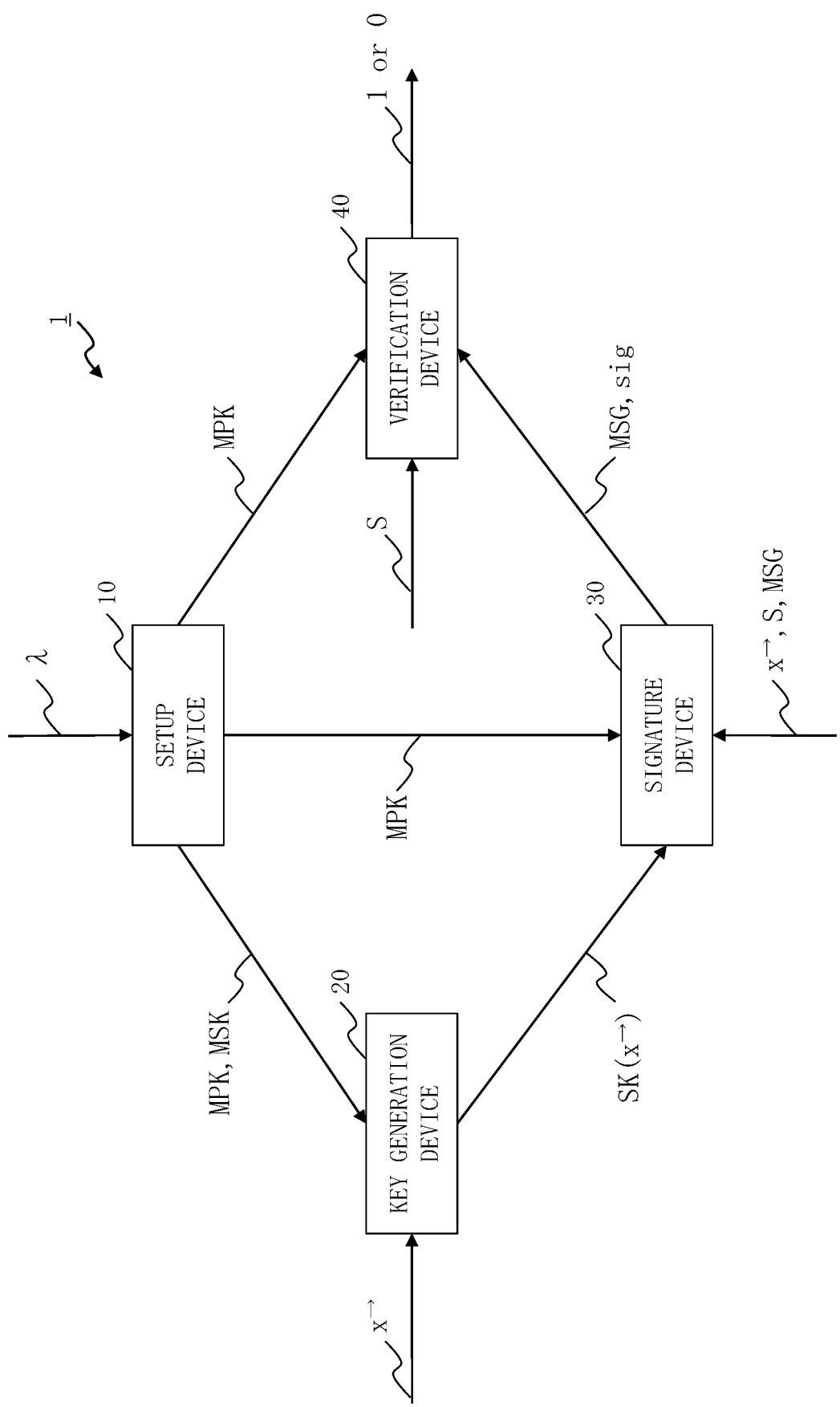
FIG. 1 is a configuration diagram of a signature system 1 according to a first embodiment.

Notations to be used in the following description will be described.

Formula 101 denotes a security parameter, and $1^\lambda$ represents unary encoding.

$$\lambda \in \mathbb{N} \qquad \text{[Formula 101]}$$

Formula 102 denotes a finite field modulo q. Formula 102 will be written as a field $F_q$ or simply as $F_{q'}$.

$$\mathbb{F} \text{ for any prime } q \in \mathbb{N} \qquad \text{[Formula 102]}$$

For Formula 103, Formula 104 is defined.

$$d \in \mathbb{N},$$

$$c \in \mathbb{N} \cup \{0\}(c<d) \qquad \text{[Formula 103]}$$

$$[d]=\{1,\ldots,d\},$$

$$[c,d]=\{c,\ldots,d\} \qquad \text{[Formula 104]}$$

Formula 105 denotes a process of uniformly sampling an element z from a set Z.

$$z \xleftarrow{U} Z \qquad \text{[Formula 105]}$$

Z denotes the size or cardinality of the set Z.

For a probabilistic algorithm P, Formula 106 denotes a process of sampling Π from the output distribution of the algorithm P on input Θ with a uniform random tape.

$$\Pi \xleftarrow{R} P(\Theta) \qquad \text{[Formula 106]}$$

For a deterministic algorithm D, Π=V(Θ) denotes output of the algorithm D on input Θ.

It is assumed that each algorithm is given the unary representation $1^\lambda$ of the security parameter $\lambda$ as input without any explicit indication of the input when it is clear from the context.

For Formula 107, Formula 108 denotes a vector indicated in Formula 109. Formula 108 will be written as $\vec{v}$.

$$\mathbb{F}, d \in \mathbb{N} \qquad \text{[Formula 107]}$$

$$\vec{v} \qquad \text{[Formula 108]}$$

$$(v_1, \ldots, v_d) \in \mathbb{F}^d$$

where $v_i \in \mathbb{F}$ for all $i \in [d]$ [Formula 109]

An all zero vector over a field $F_q^d$ will be written as indicated in Formula 110.

$$\vec{0}^d \qquad \text{[Formula 110]}$$

A normal basis vector over the field $F_q^d$ is represented as indicated in Formula 111.

$$\vec{e}(d, i) = (\overbrace{0, \ldots, 0}^{i-1}, 1, \overbrace{0, \ldots, 0}^{d-i}) \text{ for } i \in [d] \qquad \text{[Formula 111]}$$

For two vectors indicated in Formula 112, Formula 113 denotes the inner product of a vector $\vec{v}$ and a vector $\vec{w}$. That is, Formula 113 denotes Formula 114.

$$\vec{v}, \vec{w} \in \mathbb{F}_q^d \qquad \text{[Formula 112]}$$

$$\vec{v} \cdot \vec{w} \qquad \text{[Formula 113]}$$

$$\vec{v} \cdot \vec{w} = \sum_{i \in [d]} v_i w_i \in \mathbb{F}_q \qquad \text{[Formula 114]}$$

Formula 115 denotes a subspace of the field $F_q^d$ formed by Formula 116.

for any $s \in \mathbb{N}$, and any $\{\vec{v}^{(i)}\}_{i \in [s]} \subset \mathbb{F}_q^d$ [Formula 115]

$$\text{SPAN}\langle \vec{v}|i \in [s] \rangle \qquad \text{[Formula 116]}$$

Formula 117 denotes a multiplicative cyclic group. Formula 117 will be written as a group G or simply as G.

$$\mathbb{G} \qquad \text{[Formula 117]}$$

For the group G and a generator g of the group G, v denotes a d-dimensional vector of group elements. That is, this is expressed in Formula 118.

$$v = (g^{v_1}, \ldots, g^{v_d}) \in \mathbb{G}^d \text{ for some } d \in \mathbb{N}$$

where $\vec{v} = (v_1, \ldots, v_d) \in \mathbb{F}^d$ [Formula 118]

$M = (m_{k,i})$ denotes a d×r matrix with entries $m_{i,k} \in F_q$. $M^T$ denotes a transpose of the matrix M. Note that det(M) denotes a determinant of the matrix M. In describing matrices, I denotes an identity matrix, and 0 denotes a zero matrix. $GL(d, F_q)$ denotes a set of all d×d invertible matrices over $F_q^{d \times d}$.

Preliminaries

Definitions of terms and the like to be used in the following description will be described.

In a first embodiment, an ABS scheme using a predicate of ABP will be described. In the first embodiment, an arithmetic span program (ASP) representation of a predicate of ABP is used. Therefore, ABP and ASP will be described.

<ABP>

A branching program (BP) $\Gamma$ is defined by five elements indicated in Formula 119.

$$\Gamma = (\mathbb{V}, \mathbb{E}, V_0, V_1, \phi) \qquad \text{[Formula 119]}$$

Formula 120 denotes a set of vertices, and Formula 121 denotes a set of edges. Formula 120 will be written simply as V, and Formula 121 will be written simply as E.

$$\mathbb{V} \qquad \text{[Formula 120]}$$

$$\mathbb{E} \qquad \text{[Formula 121]}$$

(V, E) is a directed acyclic graph. $V_0$ and $V_1 \in V$ are special vertices called a source and a sink respectively, and $\varphi$ is a labeling function for edges in E.

An ABP F over the finite field $F_q$ computes a function f indicated in Formula 122.

$$f: \mathbb{F}_q^n \to \mathbb{F}_q \text{ for some } n \in \mathbb{N} \qquad \text{[Formula 122]}$$

Note that the labeling function $\varphi$ assigned to each edge in E is a degree one polynomial in one variable with coefficients over $F_q$ or a constant over $F_q$. Let p be a set of all paths from the source $V_0$ to the sink $V_1$ in the ABP $\Gamma$. The output of the function f computed by the ABP $\Gamma$ on some input $\vec{x} = (x_1, \ldots, x_d) \in F_q^d$ is defined as indicated in Formula 123.

$$f(\vec{x}) = \sum_{\mathbb{P} \in p} \left[ \prod_{E \in \mathbb{P}} \phi(E) \bigg|_{\vec{x}} \right] \qquad \text{[Formula 123]}$$

Formula 124 denotes an evaluation value of the function $\varphi(E)$ at $\vec{x}$.

$$E \in \mathbb{E}, \phi(E)|_{\vec{x}} \qquad \text{[Formula 124]}$$

The following content is described in Non-Patent Literature "Ishai, Y., Kushilevitz, E.: Perfect constant-round secure computation via perfect randomizing polynomials. In: International Colloquium on Automata, Languages, and Programming-ICALP 2002. pp. 244-256. Springer (2002)".

If ABP $\Gamma = (V, E, V_0, V_1, \varphi)$ computing a function f is given, it is possible to efficiently and deterministically compute a function L mapping input $\vec{x} \in F_q^d$ to a (#V-1)× (#V-1) matrix $L(\vec{x})$ over $F_q$. The following (1) to (3) hold:
(1) $\det(L(\vec{x})) = f(\vec{x})$.
(2) Each entry of $(L(\vec{x}))$ is a degree one polynomial in one variable $x_i$ ($i \in [d]$) with coefficients over $F_q$ or a constant over $F_q$.
(3) $(L(\vec{x}))$ contains only $-1$'s in the second diagonal, that is, the diagonal just below the main diagonal, and contains only 0's below the second diagonal.

Specifically, the matrix L is obtained by removing the column corresponding to $V_0$ and the row corresponding to $V_1$ from a matrix $A_\Gamma$-I, where the matrix $A_\Gamma$ is an adjacency matrix for $\Gamma$ and I is an identity matrix.

Note that there exists a linear-time algorithm that converts any Boolean formula, Boolean branching program, or arithmetic formula to an ABP.

<ASP>

An access structure $S = (U, \rho)$ in n variables is a set U of a pair of vectors indicated in Formula 125 and a function p indicated in Formula 126.

$$U = \{\vec{y}^{(j)}, \vec{z}^{(j)}\}_{j \in [m]} \text{ for } m \in \mathbb{N} \qquad \text{[Formula 125]}$$

where for all $j \in [m], (\vec{y}^{(j)}, \vec{z}^{(j)}) \in (\mathbb{F}_q^L)^2$ for $L \in \mathbb{N}$ [Formula 125]

$$\rho: [m] \to [n] \qquad \text{[Formula 126]}$$

If and only if Formula 127 holds, an attribute vector $\vec{x}$ indicated in Formula 128 satisfies the access structure S.

$$\vec{e}^{(L,L)} \in \mathrm{SPAN}\langle x_{\rho(j)} \vec{y}^{(j)} + \vec{z}^{(j)} | j \in [m] \rangle \quad \text{[Formula 127]}$$

$$\vec{x} \in \mathbb{F}_q^n \quad \text{[Formula 128]}$$

ABP and ASP are related to each other as described below.

Non-Patent Literature "Ishai, Y., Wee, H.: Partial garbling schemes and their applications. In: ICALP2014. pp. 650-662. Springer" discusses that for Formula 129, if ABP Γ=(V, E, V$_0$, V$_1$, φ) of a size m+1 computing a function f indicated in Formula 130 is given, there exists an efficient algorithm that constructs an access structure S of ASP indicated in Formula 131.

$$n, m \in \mathbb{N} \quad \text{[Formula 129]}$$

$$f: \mathbb{F}_q^n \to \mathbb{F}_q \quad \text{[Formula 130]}$$

$$\mathbb{S} = (\mathbb{U} = \{\vec{y}^{(j)}, \vec{z}^{(j)}\}_{j \in [m]} \subset (\mathbb{F}_q^{(m+1)})^2, \rho: [m] \to [n]) \quad$$

such that for all $\vec{x} \in \mathbb{F}_q^n, f(\vec{x}) = 0 \Leftrightarrow \mathbb{S}$ accepts $\vec{x}$ [Formula 131]

Formula 132 signifies that $f(\vec{x})=0$ and that the access structure S accepts $\vec{x}$ are equivalent.

$$f(\vec{x})=0 \Leftrightarrow \mathbb{S} \text{ accepts } \vec{x} \quad \text{[Formula 132]}$$

In the first embodiment, ABS is realized in dual pairing vector spaces (DPVS), which are dual vector spaces. Therefore, DPVS and a bilinear group, which is a prerequisite for DPVS, will be described.

<Bilinear Group>

Note that paramG, which is a bilinear group, indicated in Formula 133 includes a prime q, cyclic multiplicative groups $G_1$, $G_2$, and $G_T$ of order q, a generator $g_1$ of the group $G_1$, a generator $g_2$ of the group $G_2$, and a bilinear map e indicated in Formula 134.

$$\text{params } \mathbb{G} = (q, G_1, G_2, G_T, g_1, g_2, e) \quad \text{[Formula 133]}$$

$$e: G_1 \times G_2 \to G_T \quad \text{[Formula 134]}$$

The bilinear map e has the following two properties of bilinearity and non-degeneracy:

(Bilinearity)
Formula 135 holds.

$$e(g_1^\gamma, g_2^{\hat{\gamma}}) = e(g_1, g_2)^{\gamma \hat{\gamma}} \text{ for all } \gamma, \hat{\gamma} \in \mathbb{F} \quad \text{[Formula 135]}$$

(Non-Degeneracy)
Formula 136 holds. Note that Formula 137 denotes an identity element of the group $G_T$.

$$e(g_1, g_2) \neq 1_{G_T} \quad \text{[Formula 136]}$$

$$1_{G_T} \quad \text{[Formula 137]}$$

In the following description, let $G_{BPG}(\ )$ be a bilinear group generation algorithm. That is, $G_{BPG}$ is an algorithm that generates paramG.

<Dual Pairing Vector Spaces (hereinafter, DPVS)>

Note that paramv, which is DPVS, indicated in Formula 138 is formed by the direct product of paramG, which is a bilinear group, and paramv includes a prime q, a d-dimensional vector space $V = G_1^d$ and a d-dimensional vector space $V^* = G_2^d$ over the field $F_q$ under vector addition and scalar multiplication defined for each element, canonical bases $A_r$, indicated in Formula 139, of the vector space V and the vector space V*, and a pairing operation e indicated in Formula 140.

$$\text{params}_V = (q, V, V^*, G_T, A, A^*, e) \quad \text{[Formula 138]}$$

$$\mathbb{A} = \left\{ a^{(i)} = (\overbrace{1_{G_1}, \ldots, 1_{G_1}}^{i-1}, g_1, \overbrace{1_{G_1}, \ldots, 1_{G_1}}^{d-i}) \right\}_{i \in [d]}, \quad \text{[Formula 139]}$$

$$\mathbb{A}^* = \left\{ a^{*(i)} = (\overbrace{1_{G_2}, \ldots, 1_{G_2}}^{i-1}, g_2, \overbrace{1_{G_2}, \ldots, 1_{G_2}}^{d-i}) \right\}_{i \in [d]}$$

$$e: V \times V^* \to G_T \quad \text{[Formula 140]}$$

defined by $e(v, w) = \prod_{i \in [d]} e(g_1^{v_i}, g_2^{w_i}) \in G_T$ for all $v = (g_1^{v_1}, \ldots, g_1^{v_d}) \in V, w = (g_2^{w_1}, \ldots, g_2^{w_d}) \in V^*$ In Formula 139, Formula 141 is identity elements.

$$1_{G_1}, 1_{G_2} \quad \text{[Formula 141]}$$

The map e in paramv has the following two properties of bilinearity and non-degeneracy:

(Bilinearity)
Formula 142 holds.

$$e(\gamma v, \hat{\gamma} w) = e(v, w)^{\gamma \hat{\gamma}} \text{ for all } \gamma, \hat{\gamma} \in \mathbb{F}_q, v \in V, w \in V^* \quad \text{[Formula 142]}$$

(Non-degeneracy)
Formula 143 holds.

If $e(v, w) = 1_{G_T}$ for all $w \in V^*$, then $v = \overbrace{1_{G_1}, \ldots, 1_{G_1}}^{d}$ [Formula 143]

Formula 143 holds even if v and w are interchanged.

For a basis W of the vector space V (or the vector space V*) indicated in Formula 144 and a vector $\vec{v} \in F_q^d$, Formula 145 denotes a vector of the vector space V (or the vector space V*) formed by a linear combination of elements of the basis W and elements of the vector $\vec{v}$. That is, Formula 145 denotes Formula 146.

$$W = \{w^{(1)}, \ldots, w^{(d)}\} \text{ of } V(\text{or } V^*) \quad \text{[Formula 144]}$$

$$(\vec{v})_W \quad \text{[Formula 145]}$$

$$(\vec{v})_W = \sum_{i \in [d]} v_i w^{(i)} \in V(\text{or } V^*) \quad \text{[Formula 146]}$$

For a set of vectors indicated in Formula 147, Formula 148 denotes a subspace of the vector space V formed by the set of vectors indicated in Formula 147.

$$\{v^{(i)}\}_{i \in [s]} \text{of } V(\text{or } V^*), s \in \mathbb{N} \quad \text{[Formula 147]}$$

$$\mathrm{SPAN}\langle v^{(i)} | i \in [s] \rangle \quad \text{[Formula 148]}$$

In the following description, let $G_{DPVS}(1^\lambda, d)$ be a DPVS generation algorithm. That is, $G_{DPVS}$ is an algorithm that takes as input a unary encoded security parameter $1^\lambda$ and a natural number d indicating a dimension, and generates paramv with a d-dimensional vector space V and a d-dimensional vector space V.

In the first embodiment, ABS is realized using a collision-resistant hash function. Therefore, the collision-resistant hash function to be used in the first embodiment will be described.

<Collision-Resistant Hash Function>

A hash function family H, which is related to a bilinear group generation function $G_{BPG}$ and a polynomial poly(·) is composed of two polynomial-time algorithms, a KGen algorithm and a $H^{(\lambda, poly)}_{kh}$ algorithm.

The KGen algorithm is a hash key generation algorithm. The KGen algorithm is a probabilistic algorithm that takes as input a unary encoded security parameter $1^\lambda$, and samples a hash key hk from a key space $HK_\lambda$. The key space $HK_\lambda$ is a probabilistic space on a bit string parameterized by $\lambda$.

The $H^{(\lambda, poly)}_{kh}$ algorithm is a function that performs mapping indicated in Formula 149.

$$\mathcal{D}=\{0,1\}^{poly(\lambda)} \to \mathbb{F}_q \setminus \{0\} \quad \mathbb{F} \qquad \text{[Formula 149]}$$

That is, the $H^{(\lambda, poly)}_{kh}$ algorithm is a deterministic function that takes as input a unary encoded security parameter $1^\lambda$, and maps an element of $D=\{0, 1\}^{poly(\lambda)}$ to an element of the field $F_q$ excluding 0. Note q is the first element of paramG, which is the output of the bilinear group generation function $G_{BPG}$.

Description of Configurations

In the following description, it is assumed that q indicated in Formula 150 is a certain prime, and Formula 151 denotes a class of all functions indicated in Formula 152. In Formula 152, p is an arbitrary polynomial realized by a certain polynomial-sized ABP over the field $F_q$.

$$q \in \mathbb{N} \qquad \text{[Formula 150]}$$

$$\mathcal{F}_{ABP}^{(q)} \qquad \text{[Formula 151]}$$

$$f: \mathbb{F}_q^n \to \mathbb{F}_q \text{ for any } n=p(\lambda) \in \mathbb{N} \qquad \text{[Formula 152]}$$

In the first embodiment, the ABS scheme for a predicate family $R^{(q)}_{Z\text{-}ABP}$ indicated in Formula 153 will be described.

$$\mathcal{R}_{Z\text{-}ABP}^{(q)} = \{ \mathcal{R}_{Z\text{-}ABP}^{(q)}(f, \cdot): \mathbb{F}_q^n \to \{0,1\} | f: \mathbb{F}_q^n \to \mathbb{F}_q \in \mathcal{F}_{ABP}^{(q)} \} \text{[Formula 153]}$$

Note that Formula 154 holds.

$$\mathcal{R}_{Z\text{-}ABP}^{(q)}(f,\vec{x})=1 \text{ if } f(\vec{x})=0,$$

$$\mathcal{R}_{Z\text{-}ABP}^{(q)}(f,\vec{x})=0 \text{ otherwise,}$$

for all $f: \mathbb{F}_q^n \to \mathbb{F}_q \in \mathcal{F}_{ABP}^{(q)}, \vec{v} \in \mathbb{F}_q^n$ [Formula 154]

As stated in the description of ASP, there exists a polynomial-time algorithm that generates an access structure S of ASP indicated in Formula 156 for an input of any function f indicated in Formula 155.

$$f: \mathbb{F}_q^n \to \mathbb{F}_q \in \mathcal{F}_{ABP}^{(q)} \qquad \text{[Formula 155]}$$

$$\mathcal{S}=(U,\rho) \qquad \text{[Formula 156]}$$

such that for any $\vec{x} \in \mathbb{F}_q^n$, it holds that $$\mathcal{R}_{Z\text{-}ABP}^{(q)}(f,\vec{x})=1 \Leftrightarrow f(\vec{x})=0 \Leftrightarrow \mathcal{S} \text{ accepts } \vec{x} \qquad \text{[Formula 156]}$$

In Formula 156, Formula 157 signifies $R^{(q)}_{Z\text{-}ABP}(f, \vec{x})=1$, $f(\vec{x})=0$, and that the access structure S accept $\vec{x}$ are equivalent.

$$\mathcal{R}_{Z\text{-}ABP}^{(q)}(f,\vec{x})=1 \Leftrightarrow f(\vec{x})=0 \Leftrightarrow \mathcal{S} \qquad \text{[Formula 157]}$$

In the following description, it is assumed that a predicate $R^{(q)}_{Z\text{-}ABP}(f, \cdot) \in R^{(q)}_{Z\text{-}ABP}$ is identified by an access structure $S=(U, \rho)$, which is a corresponding ASP representation computed by a polynomial-time algorithm.

<Construction of ABS>

The ABS scheme is a scheme for a certain predicate family $R^{(q)}_{Z\text{-}ABP}$ including a message space M indicated in Formula 158 and a signature space $\Sigma$.

$$\mathcal{M} \subseteq \{0,1\}^* \qquad \text{[Formula 158]}$$

Note that * in Formula 158 denotes that the number of elements is arbitrary.

The ABS scheme includes a Setup algorithm, a KeyGen algorithm, a Sig algorithm, and a Verify algorithm.

The Setup algorithm takes as input a unary encoded security parameter $1^\lambda$, and outputs a public parameter MPK and a master secret key MSK.

The KeyGen algorithm takes as input a public parameter MPK, a master secret key MSK, and an attribute vector $\vec{x}$ indicated in Formula 159, and outputs a signature key $SK(\vec{x})$.

$$\vec{x} \in \mathbb{F}_q^n \text{ for some } n=p(\lambda) \in \mathbb{N} \qquad \text{[Formula 159]}$$

The Sig algorithm takes as input a public parameter MPK, an attribute vector $\vec{x}$ indicated in Formula 159, a signature key $SK(\vec{x})$ for the attribute vector $\vec{x}$, an access structure $S=(U, \rho)$, which is an ASP representation of a signature policy $R^{(q)}_{Z\text{-}ABP}(f, \cdot):F^n_q \to \{0, 1\} \in R^{(q)}_{Z\text{-}ABP}$, and a message $MSG \in M$, and outputs a signature sig or an identification symbol $\perp$ indicating a failure.

The Verify algorithm takes as input a public parameter MPK, an access structure $S=(U, \rho)$, which is an ASP representation of a signature policy $R^{(q)}_{Z\text{-}ABP}(f, \cdot):F^n_q \to \{0, 1\} \in R^{(q)}_{Z\text{-}ABP}$, and a pair of a message $MSG \in M$ and a signature sig $\in \Sigma$, and outputs 1 or 0.

<Configuration of Signature System 1>

Referring to FIG. 1, a configuration of a signature system 1 according to the first embodiment will be described.

The signature system 1 includes a setup device 10, a key generation device 20, a signature device 30, and a verification device 40. The setup device 10, the key generation device 20, the signature device 30, and the verification device 40 are computers. The setup device 10, the key generation device 20, the signature device 30, and the verification device 40 are connected via communication channels.

Figure 2:
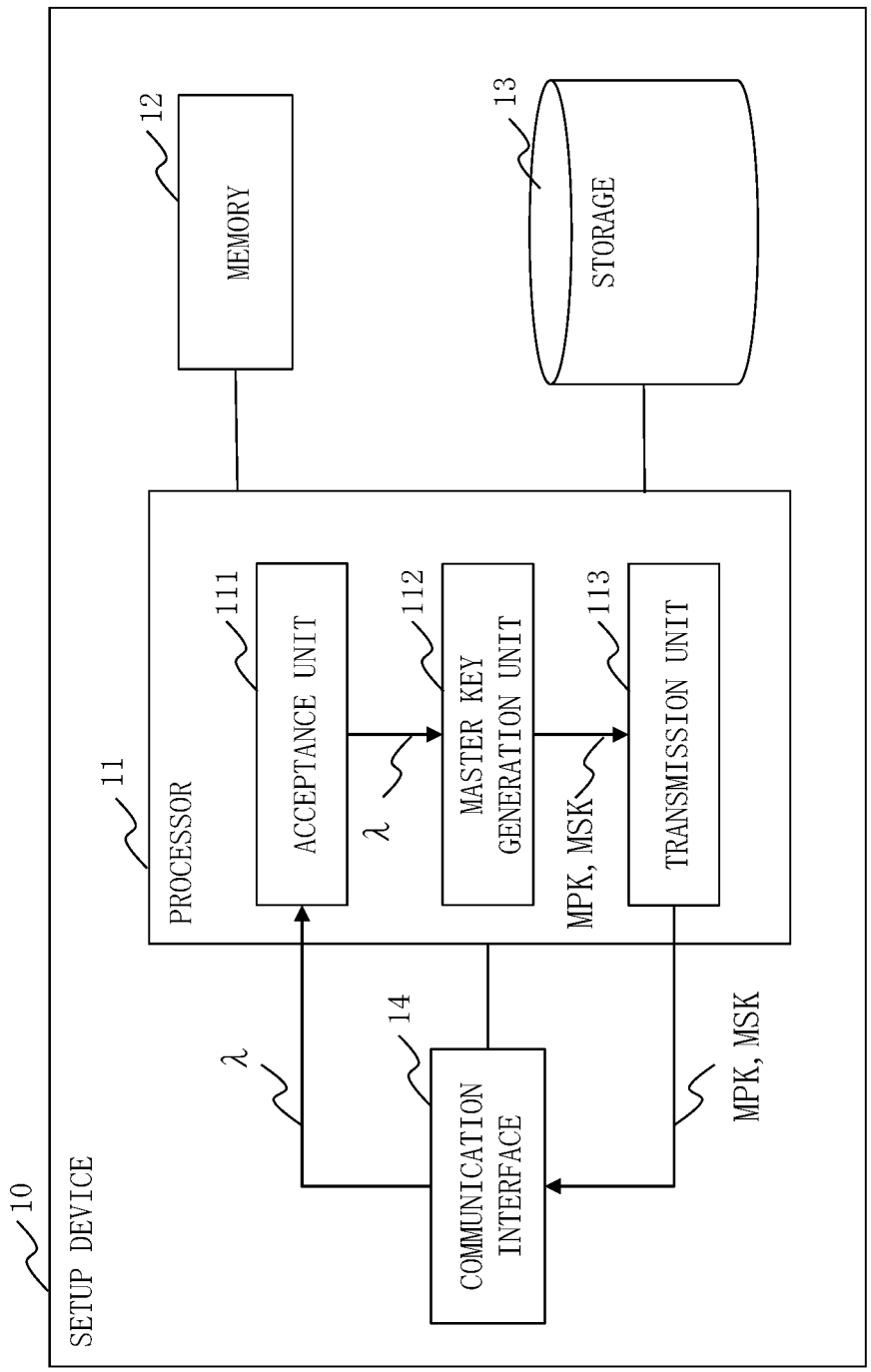
FIG. 2 is a configuration diagram of a setup device 10 according to the first embodiment.

Referring to FIG. 2, a configuration of the setup device 10 according to the first embodiment will be described.

The setup device 10 is a computer that executes the Setup algorithm.

The setup device 10 includes hardware of a processor 11, a memory 12, a storage 13, and a communication interface 14. The processor 11 is connected with the other hardware components via signal lines and controls these other hardware components.

The setup device 10 includes, as functional components, an acceptance unit 111, a master key generation unit 112, and an output unit 113. The functions of the functional components of the setup device 10 are realized by software.

The storage 13 stores programs for realizing the functions of the functional components of the setup device 10. These programs are read by the processor 11 into the memory 12 and executed by the processor 11. This realizes the functions of the functional components of the setup device 10.

Figure 3:
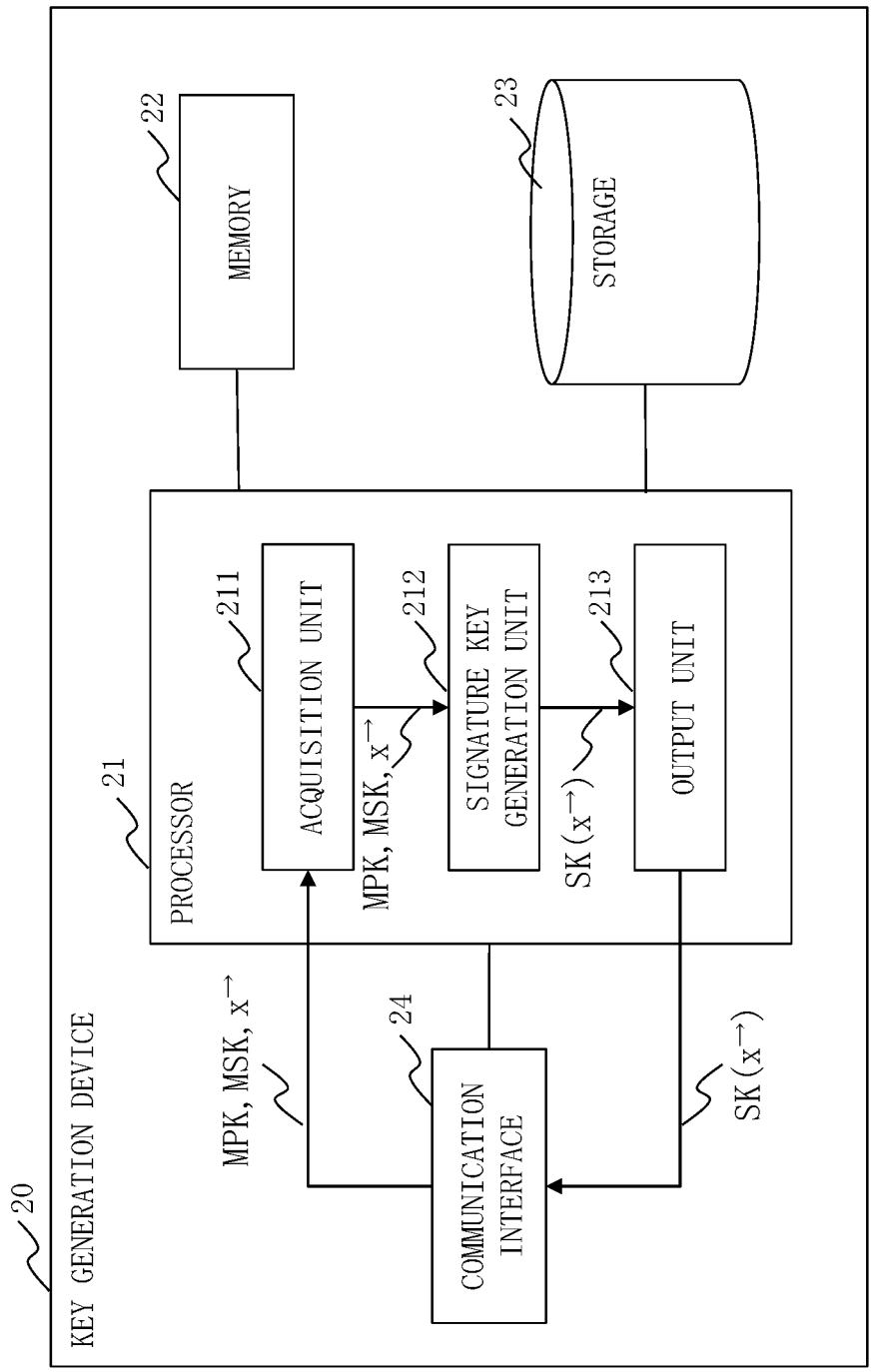
FIG. 3 is a configuration diagram of a key generation device 20 according to the first embodiment.

Referring to FIG. 3, a configuration of the key generation device 20 according to the first embodiment will be described.

The key generation device 20 is a computer that executes the KeyGen algorithm.

The key generation device 20 includes hardware of a processor 21, a memory 22, a storage 23, and a communication interface 24. The processor 21 is connected with the other hardware components via signal lines and controls these other hardware components.

The key generation device 20 includes, as functional components, an acquisition unit 211, a signature key generation unit 212, and an output unit 213. The functions of the functional components of the key generation device 20 are realized by software.

The storage 23 stores programs for realizing the functions of the functional components of the key generation device 20. These programs are read by the processor 21 into the memory 22 and executed by the processor 21. This realizes the functions of the functional components of the key generation device 20.

Figure 4:
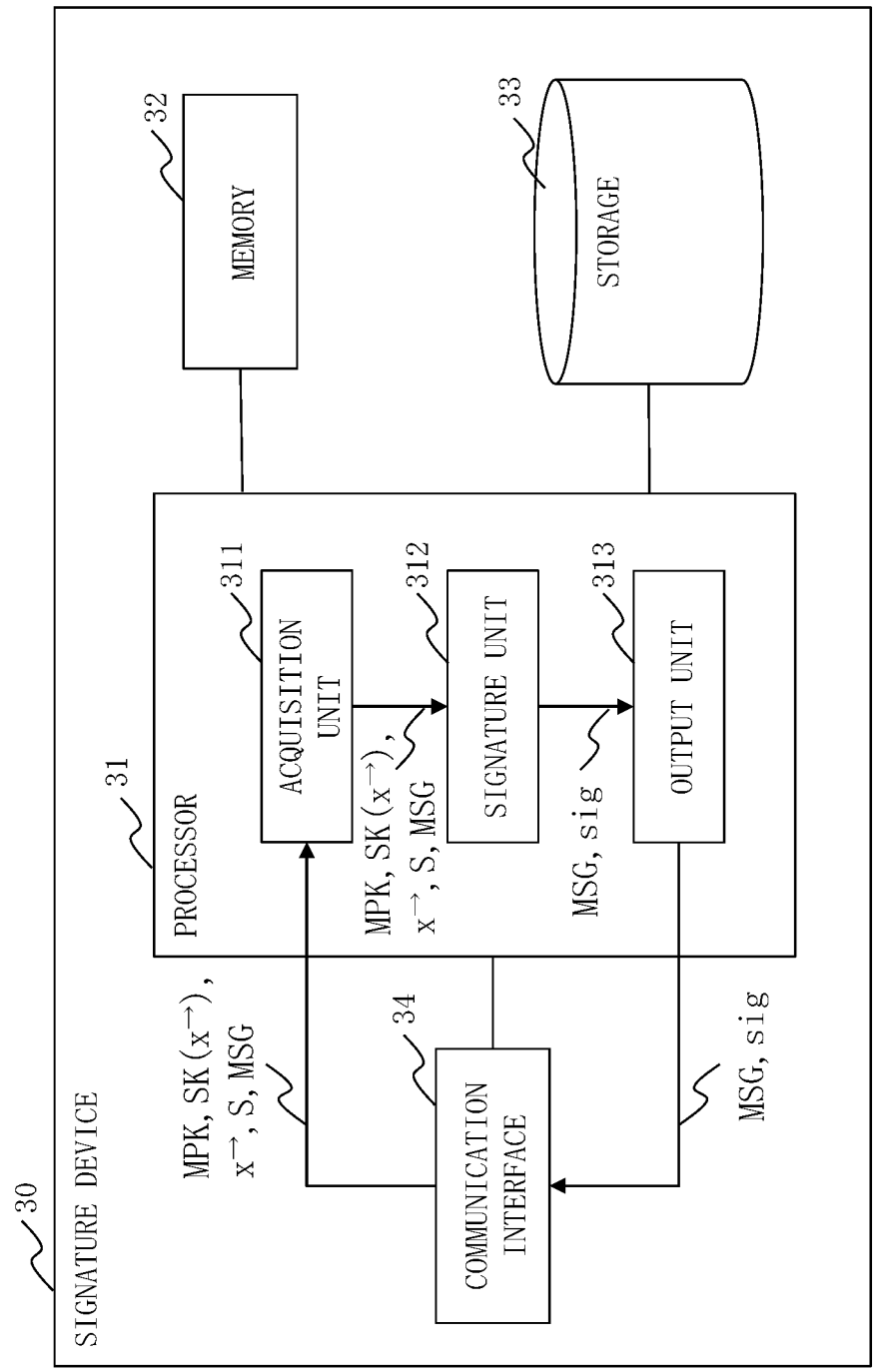
FIG. 4 is a configuration diagram of a signature device 30 according to the first embodiment.

Referring to FIG. 4, a configuration of the signature device 30 according to the first embodiment will be described.

The signature device 30 is a computer that executes the Sig algorithm.

The signature device 30 includes hardware of a processor 31, a memory 32, a storage 33, and a communication interface 34. The processor 31 is connected with the other hardware components via signal lines and controls these other hardware components.

The signature device 30 includes, as functional components, an acquisition unit 311, a signature unit 312, and an output unit 313. The functions of the functional components of the signature device 30 are realized by software.

The storage 33 stores programs for realizing the functions of the functional components of the signature device 30. These programs are read by the processor 31 into the memory 32 and executed by the processor 31. This realizes the functions of the functional components of the signature device 30.

Figure 5:
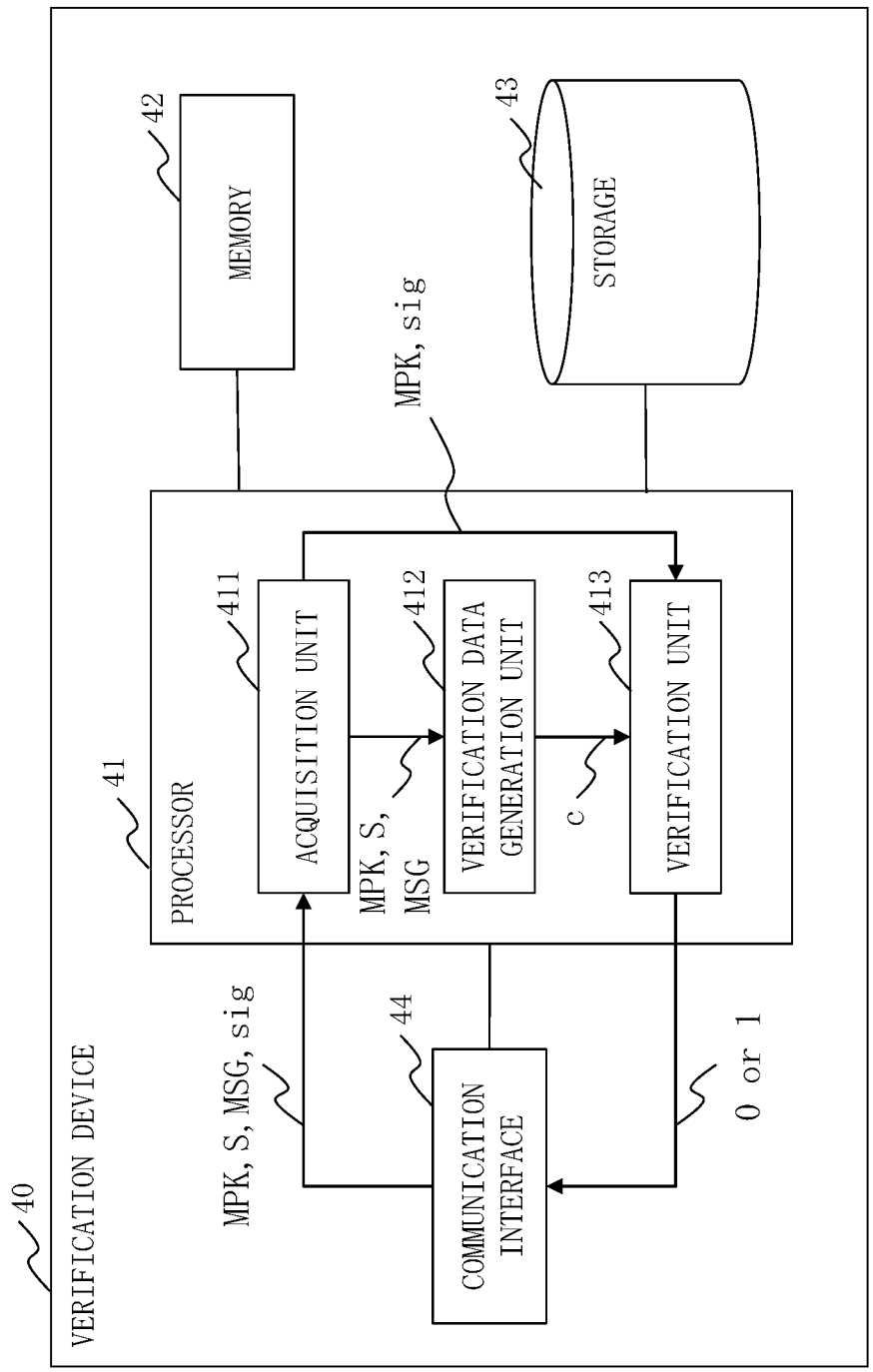
FIG. 5 is a configuration diagram of a verification device 40 according to the first embodiment.

Referring to FIG. 5, a configuration of the verification device 40 according to the first embodiment will be described.

The verification device 40 is a computer that executes the Verify algorithm.

The verification device 40 includes hardware of a processor 41, a memory 42, a storage 43, and a communication interface 44. The processor 41 is connected with the other hardware components via signal lines and controls these other hardware components.

The verification device 40 includes, as functional components, an acquisition unit 411, a verification data generation unit 412, and a verification unit 413. The functions of the functional components of the verification device 40 are realized by software.

The storage 43 stores programs for realizing the functions of the functional components of the verification device 40. These programs are read by the processor 41 into the memory 42 and executed by the processor 41. This realizes the functions of the functional components of the verification device 40.

Each of the processors 11, 21, 31, and 41 is an integrated circuit (IC) that performs processing. Specific examples of each of the processors 11, 21, 31, and 41 are a central processing unit (CPU), a digital signal processor (DSP), and a graphics processing unit (GPU).

Each of the memories 12, 22, 32, and 42 is a storage device to temporarily store data. Specific examples of each of the memories 12, 22, 32, and 42 are a static random access memory (SRAM) and a dynamic random access memory (DRAM).

Each of the storages 13, 23, 33, and 43 is a storage device to store data. A specific example of each of the storages 13, 23, 33, and 43 is a hard disk drive (HDD). Alternatively, each of the storages 13, 23, 33, and 43 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 14, 24, 34, and 44 is an interface for communicating with external devices. Specific examples of each of the communication interfaces 14, 24, 34, and 44 are an Ethernet (registered trademark) port, a Universal Serial Bus (USB) port, and a High-Definition Multimedia Interface (HDMI, registered trademark) port.

FIG. 2 illustrates only one processor 11. However, a plurality of processors 11 may be included, and the plurality of processors 11 may execute the programs for realizing the functions in cooperation. Similarly, a plurality of processors 21, a plurality of processors 31, and a plurality of processors 41 may be included, and the plurality of processors 21, the plurality of processors 31, and the plurality of processors 41 may execute the programs for realizing the respective functions in cooperation.

Description of Operation

Referring to FIGS. 6 to 9, operation of the signature system 1 according to the first embodiment will be described.

In the following description, a function p in the description of ASP does not need to be injective. Therefore, the ABS scheme to be described below supports multiple uses of unlimited attributes in a signature policy. "Unlimited" signifies that the number of attributes is not limited by the public parameter MPK. "Multiple uses" signifies that the same attribute can be used at multiple places.

Figure 6:
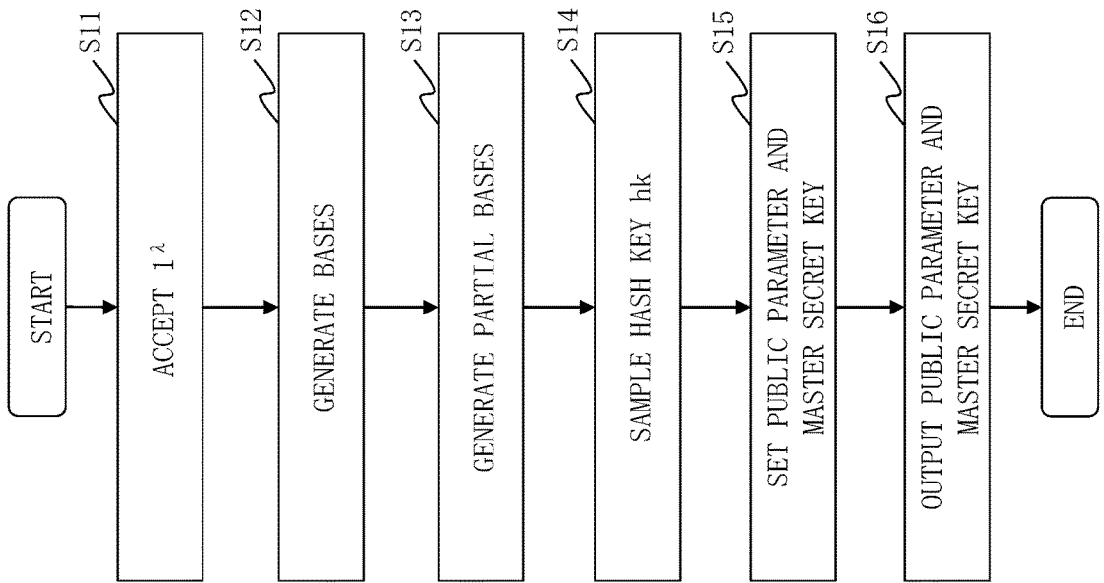
FIG. 6 is a flowchart illustrating operation of the setup device 10 according to the first embodiment.
Figure 7:
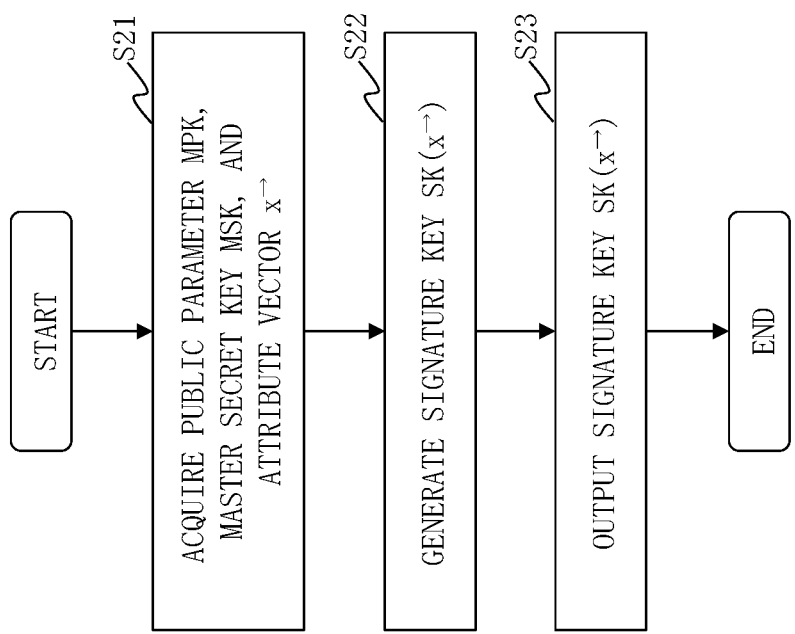
FIG. 7 is a flowchart illustrating operation of the key generation device 20 according to the first embodiment.
Figure 8:
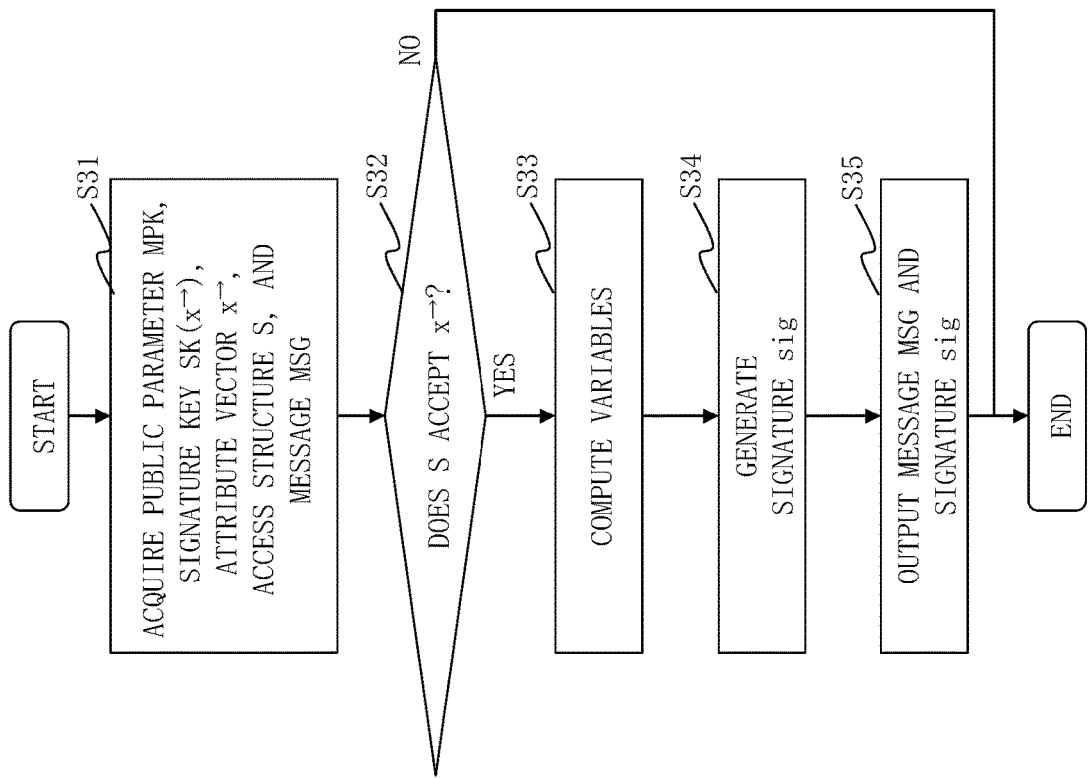
FIG. 8 is a flowchart illustrating operation of the signature device 30 according to the first embodiment.

Referring to FIG. 6, operation of the setup device 10 according to the first embodiment will be described.

The operation of the setup device 10 according to the first embodiment corresponds to a setup method according to the first embodiment. The operation of the setup device 10 according to the first embodiment also corresponds to processes of a setup program according to the first embodiment.

(Step S11: Acceptance Process)

The acceptance unit 111 accepts input of a unary encoded security parameter $1^\lambda$. The acceptance unit 111 writes the security parameter $1^\lambda$ in the memory 12.

(Step S12: Basis Generation Process)

The master key generation unit 112 generates params and orthonormal dual bases $\{B_\iota, B^*_\iota\}_{\iota \in [0,2]}$, taking as input the security parameter $1^\lambda$ accepted in step S11.

Specifically, the master key generation unit 112 retrieves the security parameter $1^\lambda$ from the memory 12. The master key generation unit 112 executes an algorithm $G_{OB}$ indicated in Formula 160, where N=2, $d_0$=4, $d_1$=14, and $d_2$=8, to generate params and the dual bases $\{B_\iota, B^*_\iota\}_{\iota \in [0,2]}$. The master key generation unit 112 writes params and the dual bases $\{B_\iota, B^*_\iota\}_{\iota \in [0,2]}$ in the memory 12.

$$G_{OB}(N, (d_0, \ldots, d_N)): \quad \text{[Formula 160]}$$

$$\text{params}_\mathbb{G} = (q, \mathbb{G}_1, \mathbb{G}_2, \mathbb{G}_T, g_1, g_2, e) \xleftarrow{R} G_{BPG}(),$$

$$\psi \xleftarrow{U} \mathbb{F}_q \backslash \{0\}, \; g_T = e(g_1, g_2)^\psi,$$

$$\text{for } \iota \in [0, N]$$

-continued $$params_{\mathbb{V}_t} = (q, \mathbb{V}_t, \mathbb{V}_t^*, \mathbb{G}_T, \mathbb{A}_t, \mathbb{A}_t^*, e)$$

$$\xleftarrow{R} G_{DPVS}(d_t, params_\mathbb{G}),$$

$$B^{(t)} = (b_{k,i}^{(t)}) \xleftarrow{U} GL(d_t, \mathbb{F}_q),$$

$$B^{*(t)} = (b_{k,i}^{*(t)}) = \psi((B^{(t)})^{-1})^T,$$

for all $k \in [d_t]$, let $\vec{b}^{(t,k)}$ and $\vec{b}^{*(t,k)}$ represent the $k^{th}$ rows of $B^{(t)}$ and $B^{*(t)}$, $$b^{(t,k)} = (\vec{b}^{(t,k)})_{\mathbb{A}_t}, b^{*(t,k)} = (\vec{b}^{*(t,k)})_{\mathbb{A}_t^*} \text{ for } k \in [d_t],$$

$$\mathbb{B}_t = \{b^{(t,1)}, \ldots, b^{(t,d_1)}\}, \mathbb{B}_t^* = \{b^{*(t,1)}, \ldots, b^{*(t,d_1)}\},$$

$$params = (\{params_{\mathbb{V}_t}\}_{t \in [0,N]}, g_T),$$

return $(params, \{\mathbb{B}_t, \mathbb{B}_t^*\}_{t \in [0,N]}).$ (Step S13: Partial Basis Generation Process)

The master key generation unit 112 generates a partial basis B^_ι and a partial basis B^*_ι from the dual bases {B_ι, B*_ι}_{ι ∈ [0,2]} generated in step S12, for each integer ι of ι 0 ∈ [0, 2].

Specifically, the master key generation unit 112 retrieves params and the dual bases {B_ι, B*_ι}_{ι ∈ [0,2]} from the memory 12. The master key generation unit 112 generates the partial basis B^_ι and the partial basis B^*_ι, for each integer ι of ι ∈ [0, 2], as indicated in Formula 161.

$$\hat{\mathbb{B}}_0 = \{b^{(0,1)}, b^{(0,4)}\},$$

$$\hat{\mathbb{B}}_0^* = \{b^{*(0,3)}\},$$

$$\hat{\mathbb{B}}_1 = \{b^{(1,1)}, \ldots, b^{(1,4)}, b^{(1,13)}, b^{(1,14)}\},$$

$$\hat{\mathbb{B}}_1^* = \{b^{*(1,1)}, \ldots, b^{*(1,4)}, b^{*(1,11)}, b^{*(1,12)}\},$$

$$\hat{\mathbb{B}}_2 = \{b^{(2,1)}, b^{(2,2)}, b^{(2,7)}b^{(2,8)}\},$$

$$\hat{\mathbb{B}}_2^* = \{b^{*(2,1)}, b^{*(2,2)}, b^{*(2,5)}, b^{*(2,6)}\} \quad \text{[Formula 161]}$$

(Step S14: Hash Key Generation Process)

The master key generation unit 112 samples a hash key hk by the KGen algorithm, as indicated in Formula 162.

$$hk \xleftarrow{R} KGen() \quad \text{[Formula 162]}$$

Note that the KGen algorithm is an algorithm for a hash function family H related to a bilinear group generation function $G_{BPG}$ and a polynomial poly(·). The polynomial poly(λ) represents the length of a bit string formed by concatenating a message belonging to a message space M and a binary ASP representation representing a signature policy predicate in a predicate family $R^{(q)}_{Z\text{-}ABP}$.

(Step S15: Master Key Setting Process)

The master key generation unit 112 sets, as a public parameter MPK, params generated in step S12, the partial basis B^_ι and the partial basis B^*_ι for each integer ι of ι ∈ [0, 2] generated in step S13, and the hash key hk generated in step S14. The master key generation unit 112 sets a basis vector $b^{*(0,1)}$ as a master secret key MSK.

Then, the master key generation unit 112 writes the public parameter MPK and the master secret key MSK in the memory 12.

(Step S16: Output Process)

The output unit 113 outputs the public parameter MPK and the master secret key MSK that are set in step S15.

Specifically, the output unit 113 retrieves the public parameter MPK and the master secret key MSK from the memory 12. The output unit 113 publishes the public parameter MPK by a method such as transmitting the public parameter MPK to a server for publication. This allows the key generation device 20, the signature device 30, and the verification device 40 to acquire the public parameter MPK. The output unit 113 transmits the master secret key MSK to the key generation device 20 in secrecy. To transmit in secrecy means to transmit after encryption by an existing encryption scheme, for example.

That is, the setup device 10 executes the Setup algorithm indicated in Formula 163.

Setup(): [Formula 163]

1. $(params, \{\mathbb{B}_t, \mathbb{B}_t^*\}_{t \in [0,2]}) \xleftarrow{R} G_{OB}(2, (4, 14, 8)),$ 2. $\hat{\mathbb{B}}_0 = \{b^{(0,1)}, b^{(0,4)}\},$ $\hat{\mathbb{B}}_0^* = \{b^{*(0,3)}\},$ $\hat{\mathbb{B}}_1 = \{b^{1,1)}, \ldots, b^{(1,4)}, b^{(1,13)}, b^{(1,14)}\},$ $\hat{\mathbb{B}}_1^* = \{b^{*(1,1)}, \ldots, b^{*(1,4)}, b^{*(1,11)}, b^{*(1,12)}\},$ $\hat{\mathbb{B}}_2 = \{b^{(2,1)}, b^{(2,2)}, b^{(2,7)}b^{(2,8)}\},$ $\hat{\mathbb{B}}_2^* = \{b^{*(2,1)}, b^{*(2,2)}, b^{*(2,5)}, b^{*(2,6)}\},$ 3. $hk \xleftarrow{R} KGen(),$ 4. output $MPK = (hk, params, \{\hat{\mathbb{B}}_t, \hat{\mathbb{B}}_t^*\}_{t \in [0,2]}), MSK = b^{*(0,1)}.$ Referring to FIG. 7, operation of the key generation device 20 according to the first embodiment will be described.

The operation of the key generation device 20 according to the first embodiment corresponds to a key generation method according to the first embodiment. The operation of the key generation device 20 according to the first embodiment also corresponds to processes of a key generation program according to the first embodiment.

(Step S21: Acquisition Process)

The acquisition unit 211 acquires the public parameter MPK and the master secret key MSK that are output in step S16. The acquisition unit 211 acquires an attribute vector $\vec{x} \in \mathbb{F}_q^n$. The attribute vector $\vec{x}$ here is an attribute of a user of a signature key $SK(\vec{x})$ to be generated. Note that n in the attribute vector $\vec{x} \in \mathbb{F}_q^n$ represents the number of elements in the attribute vector $\vec{x}$. That is, the attribute vector $\vec{x} = (x_1, \ldots, x_n)$, where n is an integer of 1 or more.

The acquisition unit 211 writes the public parameter MPK, the master secret key MSK, and the attribute vector $\vec{x}$ in the memory 22.

(Step S22: Signature Key Generation Process)

The signature key generation unit 212 samples a random number ω and a random number φ_0 to generate an element $k^{*(0)}$, as indicated in Formula 164.

$$\omega \xleftarrow{U} \mathbb{F}_q\backslash\{0\}, \phi_0 \xleftarrow{U} \mathbb{F}_q, \quad \text{[Formula 164]}$$

$$k^{*(0)} = (\omega, 0, \phi_0, 0)_{\mathbb{B}_0^*}$$

The signature key generation unit 212 samples a random number 6t and a random number $\varphi^{\rightarrow(l)}$ to generate an element $k^{*(l)}$, for each integer $\iota$ of $\iota \in [n]$, as indicated in Formula 165.

$$\sigma_t \xleftarrow{U} \mathbb{F}_q, \vec{\phi}^{(l)} \xleftarrow{U} \mathbb{F}_q^2, \qquad \text{[Formula 165]}$$

$$k^{*(l)} = \left(\sigma_t(1, t), \omega(1, x_t), \vec{0}^6, \vec{\phi}(t), \vec{0}^2\right)_{\mathbb{B}_1^*}$$

A basis vector $b^{*(1,1)}$ and a basis vector $b^{*(1,2)}$ of the basis $\mathbb{B}^*_1$ are an index part, and $\sigma_\iota(1, \iota)$ set in the index part as a coefficient is index information $I^*$ associated with an element $x_\iota$ of the attribute vector $x^\rightarrow$. The index information $I^*$ is such that the sum of element-wise inner products of the index information $I^*$ and corresponding index information $I$, which is used in the Verify algorithm to be described later, becomes 0.

The signature key generation unit 212 samples a random number $\varphi^{\rightarrow(n+1,1)}$ and a random number $\varphi^{\rightarrow(n+1,2)}$ to generate an element $k^{*(n+1,1)}$ and an element $k^{*(n+1,2)}$, as indicated in Formula 166.

$$\vec{\phi}^{(n+1,1)}, \vec{\phi}^{(n+1,2)} \xleftarrow{U} \mathbb{F}_q^2, \qquad \text{[Formula 166]}$$

$$k^{*(n+1,1)} = \left(\omega(1, 0), \vec{0}^2, \vec{\phi}^{(n+1,1)}, \vec{0}^2\right)_{\mathbb{B}_2^*},$$

$$k^{*(n+1,2)} = \left(\omega(0, 1), \vec{0}^2, \vec{\phi}^{(n+1,2)}, \vec{0}^2\right)_{\mathbb{B}_2^*},$$

The signature key generation unit 212 writes the element $k^{*(0)}$, the element $k^{*(\iota)}$ for each integer $\iota$ of $\iota \in [n]$, the element $k^{*(n+1,1)}$, and the element $k^{*(n+1,2)}$ in the memory 22 as the signature key $SK(x^\rightarrow)$.

(Step S23: Output Process)

The output unit 213 outputs the signature key $SK(x^\rightarrow)$ generated in step S22.

Specifically, the output unit 213 retrieves the signature key $SK(x^\rightarrow)$ from the memory 22. The output unit 213 transmits the signature key $SK(x^\rightarrow)$ to the signature device 30 in secrecy.

That is, the key generation device 20 executes the KeyGen algorithm indicated in Formula 167.

$$\text{KeyGen}(MPK, MSK, \vec{x}): \qquad \text{[Formula 167]}$$

1. $\omega \xleftarrow{U} \mathbb{F}_q \backslash \{0\}, \phi_0 \xleftarrow{U} \mathbb{F}_q,$ $k^{*(0)} = (\omega, 0, \phi_0, 0)_{\mathbb{B}_0^*},$ 2. for $\iota \in [n]$ $\sigma_\iota \xleftarrow{U} \mathbb{F}_q, \vec{\phi}^{(l)} \xleftarrow{U} \mathbb{F}_q^2,$ $k^{*(l)} = \left(\sigma_\iota(1, \iota), \omega(1, x_l), \vec{0}^6, \vec{\phi}^{(l)}, \vec{0}^2\right)_{\mathbb{B}_l^*},$ 3. $\vec{\phi}^{(n+1,1)}, \vec{\phi}^{(n+1,2)} \xleftarrow{U} \mathbb{F}_q^2,$ $k^{*(n+1,1)} = \left(\omega(1, 0), \vec{0}^2, \vec{\phi}^{(n+1,1)}, \vec{0}^2\right)_{\mathbb{B}_2^*},$ $k^{*(n+1,2)} = \left(\omega(0, 1), \vec{0}^2, \vec{\phi}^{(n+1,2)}, \vec{0}^2\right)_{\mathbb{B}_2^*},$ 4. output $SK(\vec{x}) = (k^{*(0)}, \ldots, k^{*(n)}, k^{*(n+1,1)}, k^{*(n+1,2)}).$ Referring to FIG. 8, operation of the signature device 30 according to the first embodiment will be described.

The operation of the signature device 30 according to the first embodiment corresponds to a signature method according to the first embodiment. The operation of the signature device 30 according to the first embodiment also corresponds to processes of a signature program according to the first embodiment.

(Step S31: Acquisition Process)

The acquisition unit 311 acquires the public parameter MPK output in step S16. The acquisition unit 311 acquires the signature key $SK(x^\rightarrow)$ output in step S23.

The acquisition unit 311 acquires the attribute vector $x^\rightarrow \in F^n_q$ of the user, an access structure S, which is an ASP representation of a signature policy $R^{(q)}_{Z\text{-}ABP}(f, \cdot): F^n_q \rightarrow \{0, 1\} \in R^{(q)}_{Z\text{-}ABP}$, and a message $MSG \in M$. The access structure S is as indicated in Formula 168.

$$\mathbb{S} = (\mathbb{U} = \{\vec{y}^{(j)}, \vec{z}^{(j)}\}_{j \in [m]} \subset (\mathbb{F}_q^L)^2, \rho: [m] \rightarrow [n] \qquad \text{[Formula 168]}$$

L is the number of elements in each of a vector $y^{\rightarrow(j)}$ and a vector $z^{\rightarrow(j)}$, and is an integer of 1 or more.

The acquisition unit 311 writes the public parameter MPK, the signature key $SK(x^\rightarrow)$, the attribute vector $x^\rightarrow \in F^n_q$ of the user, the access structure S, and the message MSG in the memory 32.

(Step S32: Determination Process)

The signature unit 312 determines whether the access structure S accepts the attribute vector $x^\rightarrow$.

If acceptance is determined, the signature unit 312 advances the process to step S33. If acceptance is not determined, the signature unit 312 outputs an identification symbol $\perp$ indicating a failure, and ends the process.

(Step S33: Variable Computation Process)

The signature unit 312 computes a scalar $(\Omega_j)_{j \in [m]} \in F^m_q$ indicated in Formula 169.

$$\vec{z}^{(L,L)} = \sum_{j \in [m]} \Omega_j \left(x_{\rho(j)} \vec{y}^{(j)} + \vec{z}^{(j)}\right) \qquad \text{[Formula 169]}$$

Note that if and only if Formula 127 holds, the attribute vector $x^\rightarrow$ indicated in Formula 128 satisfies the access structure S. Therefore, the scalar $(\Omega_j)_{j \in [m]} \in F^m_q$ indicated in Formula 169 exists and can be computed.

The signature unit 312 samples a random number a random number $\xi$, a random number $(\Omega'_j)_{j \in [m]} \in F^m_q$, and a random number $(\Omega''_j)_{j \in [m]} \in F^m_q$ indicated in Formula 170.

$$\xi \xleftarrow{U} \mathbb{F}_q \backslash \{0\}, \qquad \text{[Formula 170]}$$

$$\left((\Omega'_j)_{j \in [m]}, (\Omega''_j)_{j \in [m]}\right) \xleftarrow{U} (\mathbb{F}_q^m)^2$$

$$\text{such that } \sum_{j \in [m]} (\Omega'_j \vec{y}^{(j)} + \Omega''_j \vec{z}^{(j)}) = \vec{0}^L$$

The signature unit 312 writes the scalar $(\Omega_j)_{j \in [m]}$, the random number the random number $(\Omega'_j)_{j \in [m]}$, and the random number $(\Omega''_j)_{j \in [m]}$ in the memory 32.

(Step S34: Signature Element Generation Process)

The signature unit 312 samples a random number $r^{*(0)}$ to generate an element $s^{*(0)}$, as indicated in Formula 171.

$$r^{*(0)} \xleftarrow{U} \text{SPAN}\langle b^{*(0,3)} \rangle, \quad \text{[Formula 171]}$$

$$s^{*(0)} = \xi k^{*(0)} + r^{*(0)}$$

The random number $\xi$ and the random number $r^{*(0)}$ conceal the random number $\omega$ and the random number $\varphi_0$ that are set in the element $k^{*(0)}$ of the signature key $SK(x^{\rightarrow})$.

The signature unit 312 samples a random number $\sigma'_j$ and a random number $r^{*(j)}$ to generates an element $s^{*(j)}$, for each integer j of j ∈ [m], as indicated in Formula 172.

$$\sigma'_j \xleftarrow{U} \mathbb{F}_q, \quad \text{[Formula 172]}$$

$$r^{*(j)} \xleftarrow{U} \text{SPAN}\langle b^{*(1,11)}, b^{*(1,12)} \rangle,$$

$$s^{*(j)} = \xi \Omega_j k^*(\rho(j)) + \sigma'_j(b^{*(1,11)} + \rho(j)b^{*(1,2)}) + \Omega''_j b^{*(1,3)} + \Omega'_j b^{*(1,4)} + r^{*(j)}$$

The random number $\xi$ and the scalar $\Omega_j$ conceal the element of the attribute vector $x^{\rightarrow}$ set in the element $k^{*(1)}$ of the signature key $SK(x^{\rightarrow})$. The random number $\Omega_j$ conceals $\Omega_j x_{\rho(j)}$. The random number $\Omega''_j$ conceals the random number $\Omega'_j$.

The random number $\sigma'_j$ conceals the index information I* set in the element $k^{*(1)}$ of the signature key $SK(x^{\rightarrow})$. The random number $r^{*(1)}$ conceals the random number $\varphi^{\rightarrow(1)}$ set in the element $k^{*(1)}$ of the signature key $SK(x^{\rightarrow})$.

The signature unit 312 samples a random number $r^{*(m+1)}$ to generate an element $s^{*(m+1)}$, as indicated in Formula 173.

$$r^{*(m+1)} \xleftarrow{U} \text{SPAN}\langle b^{*(2,5)}, b^{*(2,6)} \rangle, \quad \text{[Formula 173]}$$

$$s^{*(m+1)} = \xi(k^{*(n+1,1)} + H_{hk}^{(\lambda, poly)}(MSG\|\mathbb{S})k^{*(n+1,2)}) + r^{*(m+1)}$$

The random number $\xi$ and the random number $r^{*(m+1)}$ conceal the random number $\omega$, the random number $\varphi^{\rightarrow(n+1,1)}$, and the random number $\varphi^{\rightarrow(n+1,2)}$ that are set in the element $k^{*(n+1,1)}$ and the element $k^{*(n+1,2)}$ of the signature key $SK(x^{\rightarrow})$.

The signature unit 312 writes the element $s^{*(0)}$, the element $s^{*(j)}$ for each integer j of j ∈ [m], and the element $s^{*(m+1)}$ in the memory 32 as a signature sig.

(Step S35: Output Process)

The output unit 313 outputs a pair of the message MSG acquired in step S31 and the signature sig generated in step S34.

Specifically, the output unit 313 retrieves the message MSG and the signature sig from the memory 32. The output unit 313 transmits the message MSG and the signature sig to the verification device 40.

That is, the signature device 30 executes the Sig algorithm indicated in Formula 174.

$$Sig(MPK, \vec{x}, SK, (\vec{x}), \mathbb{S}, MSG): \quad \text{[Formula 174]}$$

if $\mathbb{S}$ does not accept $\vec{x}$, it outputs ⊥,

Otherwise, i.e., if $\mathbb{S}$ accepts $\vec{x}$, it operates as follows:

1. computes $(\Omega_j)_{j \in [m]} \in \mathbb{F}_q^m$ such that $\vec{e}^{(L,L)} \sum_{j \in [m]} \Omega_j(x_{\rho(j)} \vec{y}^{(j)} + \vec{z}^{(j)})$, 2. $\xi \xleftarrow{U} \mathbb{F}_g \setminus \{0\}$, $((\Omega'_j)_{j \in [m]}, (\Omega''_j)_{j \in [m]}) \xleftarrow{U} (\mathbb{F}_q^m)^2$ such that $\sum_{j \in [m]} (\Omega'_j \vec{y}(j) = \Omega''_j \vec{z}^{(j)}) = \vec{0}^L$, 3. $r^{*(0)} \xleftarrow{U} \text{SPAN}\langle b^{*(0,3)} \rangle$, $s^{*(0)} = \xi k^{*(0)} + r^{*(0)}$, 4. for $j \in [m] \sigma'_j \xleftarrow{U} \mathbb{F}_q$, $r^{*(j)} \xleftarrow{U} \text{SPAN}\langle b^{*(1,11)}, b^{*(1,12)} \rangle$, $s^{*(j)} = \xi \Omega_j k^*(\rho(j)) + \sigma'_j(b^{*(1,1)} + \rho(j)b^{*(1,2)}) + \Omega''_j b^{*(1,3)} + \Omega'_j b^{*(1,4)} + r^{*(j)}$, 5. $r^{*(m+1)} \xleftarrow{U} \text{SPAN}\langle b^{*(2,5)}, b^{*(2,6)} \rangle$, $s^{*(m+1)} = \xi(k^{*(n+1,1)} + H_{hk}^{(\lambda, poly)}(MSG\|\mathbb{S})k^{*(n+1,2)}) + r^{*(m+1)}$, 6. output $sig = (s^{*(0)}, \ldots, s^{*(m+1)})$.

Figure 9:
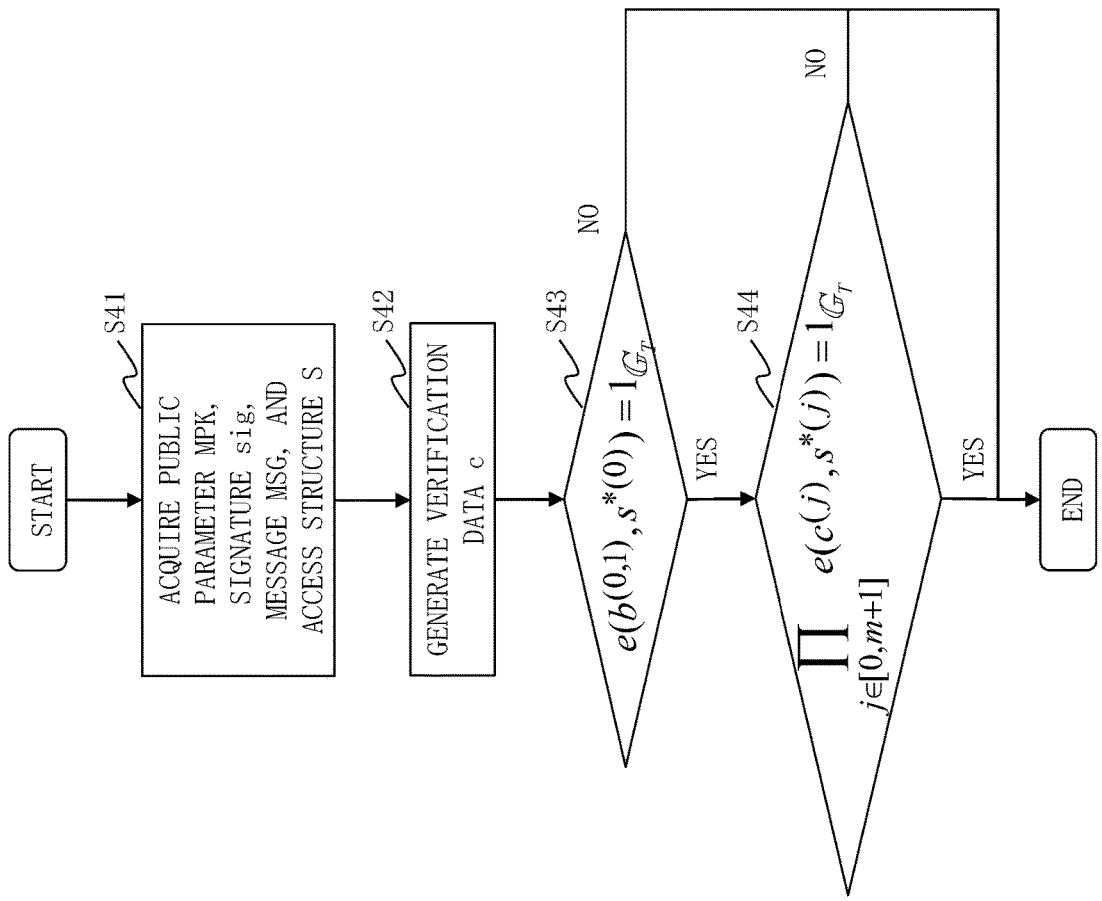
FIG. 9 is a flowchart illustrating operation of the verification device 40 according to the first embodiment.

Referring to FIG. 9, operation of the verification device 40 according to the first embodiment will be described.

The operation of the verification device 40 according to the first embodiment corresponds to a verification method according to the first embodiment. The operation of the verification device 40 according to the first embodiment also corresponds to processes of a verification program according to the first embodiment.

(Step S41: Acquisition Process)

The acquisition unit 411 acquires the public parameter MPK output in step S16. The acquisition unit 411 acquires the pair of the message MSG and the signature sig output in step S35. The acquisition unit 411 acquires the access structure S, which is the ASP representation of the signature policy $R^{(q)}_{Z\text{-}ABP}(f, \cdot): \mathbb{F}_q^n > \{0, 1\} \in R^{(q)}_{Z\text{-}ABP}$.

The acquisition unit 411 writes the public parameter MPK, the pair of the message MSG and the signature sig, and the access structure S in the memory 42.

(Step S42: Verification Data Generation Process)

The verification data generation unit 412 samples a random number $u^{\rightarrow}$ to generate a variable $s_j$ and a variable $s'_j$, which are verification information, for each integer j of j ∈ [m], as indicated in Formula 175.

$$\vec{u} = (u_1, \ldots, u_L) \xleftarrow{U} \mathbb{F}_q^L, \quad \text{[Formula 175]}$$

for $j \in [m]$ $$s_j = \vec{u} \cdot \vec{y}^{(j)},$$

$$s'_j = \vec{u} \cdot \vec{z}(j)$$

The verification data generation unit 412 samples a random number u and a random number $\eta_0$ to generate an element $c^{(0)}$, as indicated in Formula 176.

$$u, \eta_0 \xleftarrow{U} \mathbb{F}_q, \quad \text{[Formula 176]}$$
$$c^{(0)} = (-u - u_L, 0, 0, \eta_0)\mathbb{B}_0$$

The verification data generation unit 412 executes the following for each integer j of j ∈ [m].

First, the verification data generation unit 412 determines whether Formula 177 holds for the target integer j.

$$s^{*(j)} \notin \mathbb{V}_1^* \quad \text{[Formula 177]}$$

If it holds, the verification data generation unit 412 outputs 0 indicating that the validity of the signature sig cannot be confirmed, and ends the process. If it does not hold, the verification data generation unit 412 samples a random number $\mu_j$ and a random number $\eta^{\to(j)}$ to generate an element $c^{(j)}$ for the target integer j, as indicated in Formula 178.

$$\mu_j \xleftarrow{U} \mathbb{F}_q, \vec{\eta}^{(j)} \xleftarrow{U} \mathbb{F}_q^2, \quad \text{[Formula 178]}$$
$$c^{(j)} = \left(\mu_j(\rho(j), -1), (s'_j, s_j), \vec{0}^6, \vec{0}^2, \vec{\eta}^{(j)}\right)_{\mathbb{B}_1}$$

A basis vector $b^{(1,1)}$ and a basis vector $b^{(1,2)}$ of the basis $\mathbb{B}_1$ are an index part. The basis vector $b^{(1,1)}$ and the basis vector $b^{(1,2)}$ of the basis $\mathbb{B}_1$ are basis vectors corresponding to the basis vector $b^{*(1,1)}$ and the basis vector $b^{*(1,2)}$ of the basis $\mathbb{B}^*_1$. The basis vectors corresponding to each other signifies the basis vectors of which an inner product is computed by a pairing operation.

Note that $\mu_j(\rho(j), -1)$ set in the index part as a coefficient is index information I. The index information I is such that the sum of element-wise inner products of the index information I and the corresponding index information I*, which is used in the signature key $SK(x^\to)$, becomes 0. That these pieces of index information correspond to each other signifies that $\iota$ and $\rho(j)$ correspond to each other, and signifies $\iota = \rho(j)$.

Specifically, the index information I* is $\sigma_\iota(1, \iota)$ and the index information I is $\mu_j(\rho(j), -1)$. Since $\iota = \rho(j)$, then $\sigma_\iota \mu_j(1 \cdot \iota - 1 \cdot \iota) = 0$.

The verification data generation unit 412 samples a random number $\kappa$ and a random number $\eta^{\to(m+1)}$ to generate an element $c^{(m+1)}$ as indicated in Formula 179.

$$\kappa \xleftarrow{U} \mathbb{F}_q, \vec{\eta}^{(m+1)} \xleftarrow{U} \mathbb{F}_q^2, \quad \text{[Formula 179]}$$
$$c^{(m+1)} = \left((u - \kappa H_{hk}^{(\lambda,poly)}(MSG\|\$), \kappa), \vec{0}^2, \vec{0}^2, \vec{\eta}^{(m+1)}\right)_{\mathbb{B}_2}$$

(Step S43: First Verification Process)

The verification unit 413 determines whether Formula 180 holds.

$$e(b^{(0,1)}, s^{*(0)}) = 1_{\mathbb{G}_T} \quad \text{[Formula 180]}$$

If it holds, the verification unit 413 outputs 0 indicating that the validity of the signature sig cannot be confirmed, and ends the process. If it does not hold, the verification unit 413 advances the process to step S44.

(Step S44: Second Verification Process)

The verification unit 413 determines whether Formula 181 holds.

$$\prod_{j \in [0, m+1]} e(c^{(j)}, s^{*(j)}) = 1_{\mathbb{G}_T} \quad \text{[Formula 181]}$$

If it holds, the verification unit 413 outputs 1 indicating that the validity of the signature sig has been successfully confirmed, and ends the process. If it does not hold, the verification unit 413 outputs 0 indicating that the validity of the signature sig cannot be confirmed, and ends the process.

As indicated in Formula 182, if the signature sig is valid, Formula 181 holds.

$$\prod_{j \in [0,m+1]} e(c^{(j)}, s^{*(j)}) = e(c^{(0)}, k^{*(0)})\xi \cdot \prod_{j \in [m]} e(c^{(j)}, k^{*(\rho(j))})^{\xi\Omega_j} \cdot \quad \text{[Formula 182]}$$

$$\prod_{j \in [m]} e(c^{(j)}, b^{*(1,3)})^{\Omega'_j} e(c^{(j)}, b^{*(1,4)})^{\Omega''_j} \cdot$$

$$\left[\begin{array}{c} e(c^{(m+1)}, k^{*(n+1,1)}) \cdot e(c^{(m+1)}, k^{*(n+1,2)}) \\ H_{hk}^{(\lambda,poly)}(MSG\|\$) \end{array}\right]^\xi$$

$$= g_T^{\xi\omega(-u-u_L)} \cdot \prod_{j \in [m]} g_T^{\xi\omega\Omega_j(x_{\rho(j)}s_j + s'_j)} \cdot$$

$$\prod_{j \in [m]} g_T^{(\Omega'_j s_j + \Omega''_j s'_j)} \cdot g_T^{\xi\omega u}$$

$$= g_T^{\xi\omega(-u-u_L)} \cdot g_T^{\xi\omega(\vec{u} \cdot \Sigma_{j \in [m]} \Omega_j(x_{\rho(j)} \vec{y}^{(j)} + \vec{z}^{(j)}))} \cdot$$

$$g_T^{\vec{u} \cdot \Sigma_{j \in [m]}(\Omega'_j \vec{y}^{(j)} + \Omega''_j \vec{z}^{(j)})} \cdot g_T^{\xi\omega u}$$

$$= g_T^{\xi\omega(-u-u_L)} \cdot g_T^{\xi\omega(\vec{u} \cdot \vec{e}^{(L,L)})} \cdot g_T^{\vec{u} \cdot \vec{0}^L} \cdot g_T^{\xi\omega u}$$

$$= g_T^{\xi\omega(-u-u_L)} \cdot g_T^{\xi\omega u_L} \cdot 1_{\mathbb{G}_T} \cdot g_T^{\xi\omega u}$$

$$= 1_{\mathbb{G}_T}$$

That is, the verification device 40 executes the Verify algorithm indicated in Formula 183.

Verify(*MPK*, $, (*MSG*, *sig*)):   Formula 183

1. (a) $\vec{u} = (u_1, \ldots, u_L) \xleftarrow{U} \mathbb{F}_q^L$, for $j \in [m] s_j = \vec{u} \cdot \vec{y}^{(j)}, s'_j = \vec{u} \cdot \vec{z}^{(j)}$, (b) $u, \eta_0 \xleftarrow{U} \mathbb{F}_q, c^{(0)} = (-u - u_L, 0, 0, \eta_0)_{\mathbb{B}_0}$, (c) for $j \in [m]$ if $s^{*(j)} \notin \mathbb{V}_1^*$ then it outputs 0.

Otherwise, $\mu_j \xleftarrow{U} \mathbb{F}_g, \vec{\eta}^{(j)} \xleftarrow{U} \mathbb{F}_q^2$, $c^{(j)} = \left(\mu_j(\rho(j), -1), (s'_j,, s_j), \vec{0}^6, \vec{0}^2, \vec{\eta}^{(j)}\right)_{\mathbb{B}_1}$ (d) $\kappa \xleftarrow{U} \mathbb{F}_q, \vec{\eta}^{(m+1)} \xleftarrow{U} \mathbb{F}_q^2$, $c^{(m+1)} = \left((u - \kappa H_{hk}^{(\lambda,poly)}(MSG\|\$), \vec{0}^2, \vec{0}^2, \vec{\eta}^{(m+1)}\right)_{\mathbb{B}_2}$ 2. It outputs 1 if $e(b^{(0,1)}, s^{*(0)}) = 1_{\mathbb{G}_T}$, 3. It outputs 1 if $\prod_{j \in [0, m+1]} e(c^{(j)}, s^{*(j)}) = 1_{\mathbb{G}_T}$.

It outputs 0 otherwise.

Effects of First Embodiment

As described above, the signature system 1 according to the first embodiment realizes the ABS scheme using a predicate vector of ABP. Thus, the ABS scheme that is practical is realized.

The signature system 1 according to the first embodiment sets the index information I* as a coefficient in the index part of the signature key $SK(\vec{x})$, and sets the index information I as a coefficient in the index part of the verification data. If ι of the index information I* and ρ(j) of the index information I correspond to each other, the index part becomes 0 when a pairing operation is performed on the element $s^{*(j)}$ of the signature sig and the element $c^{(j)}$ of the verification data. If ι of the index information I* and ρ(j) of the index information I do not correspond to each other, the index part does not become 0 when a pairing operation is performed on the element $s^{*(j)}$ of the signature sig and the element $c^{(j)}$ of the verification data.

This allows security to be secured even when the basis $B_1$ and the basis $B^*_1$ that are common to all elements of the attribute vector $\vec{x}$ are used instead of using a different bases for each element of the attribute vector $\vec{x}$. As a result, it is sufficient that the basis $B\hat{}_1$ and the basis $B\hat{}^*_1$ be included in the public parameter MPK, regardless of the number of elements in the attribute vector $\vec{x}$. That is, the number of elements in the attribute vector $\vec{x}$ to be used can be changed arbitrarily without changing the public parameter MPK.

Other Configurations

<First Variation>

In the first embodiment, basis vectors of two dimensions are used as the index part. However, provided that the sum of inner products of the index information I* and the index information I becomes 0, basis vectors of any number of dimensions can be used as the index part.

<Second Variation>

In the first embodiment, the functional components are realized by software. However, as a second variation, the functional components may be realized by hardware. With regard to the second variation, differences from the first embodiment will be described.

Figure 10:
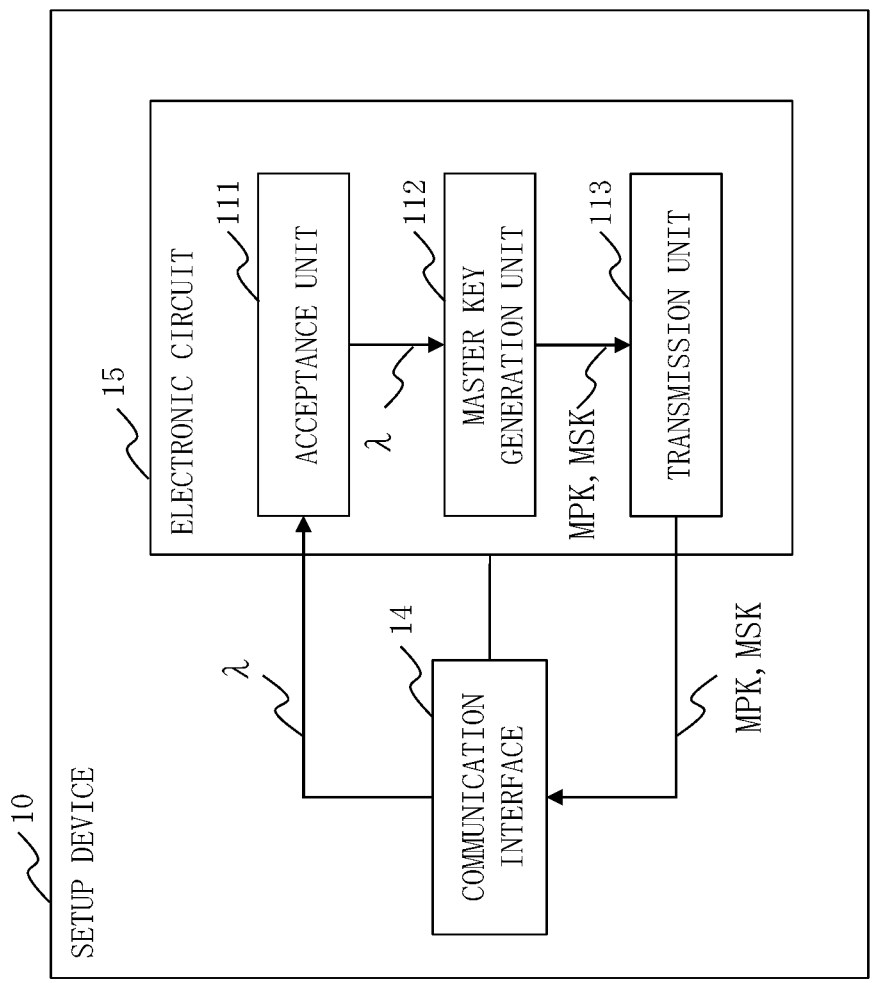
FIG. 10 is a configuration diagram of the setup device 10 according to a second variation.

Referring to FIG. 10, a configuration of the setup device 10 according to the second variation will be described.

When the functional components are realized by hardware, the setup device 10 includes an electronic circuit 15 in place of the processor 11, the memory 12, and the storage 13. The electronic circuit 15 is a dedicated circuit that realizes the functions of the functional components, the memory 12, and the storage 13.

Figure 11:
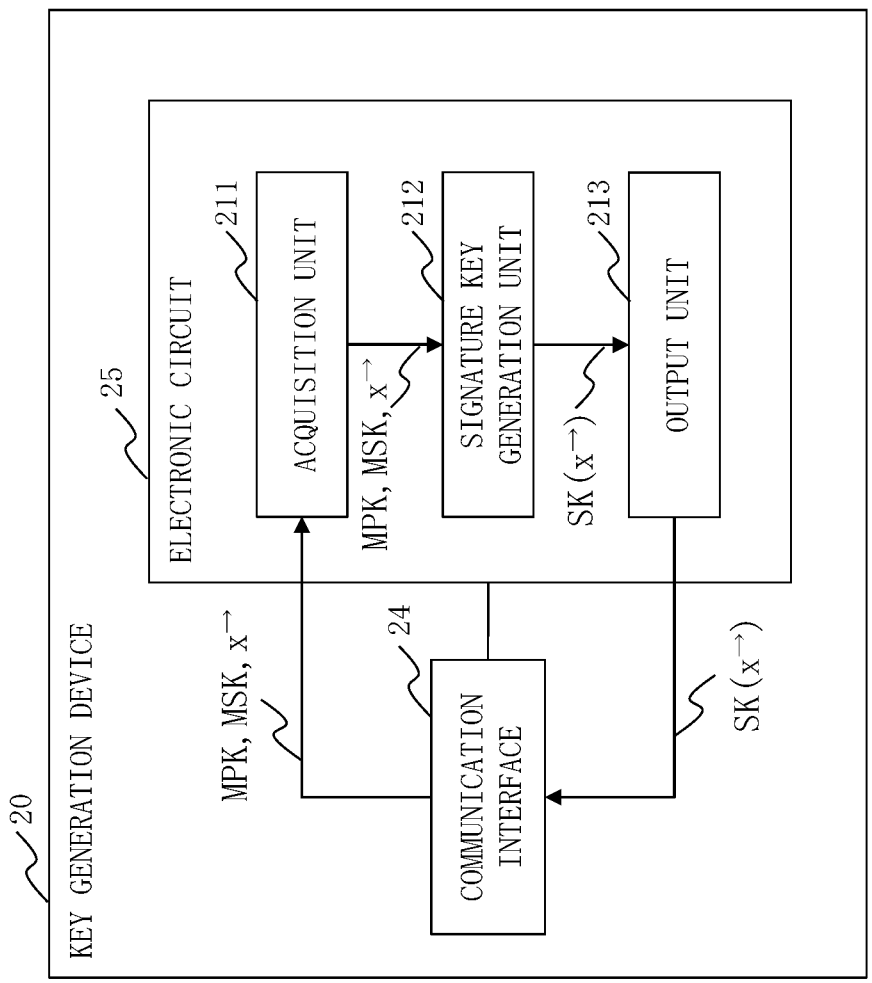
FIG. 11 is a configuration diagram of the key generation device 20 according to the second variation.

Referring to FIG. 11, a configuration of the key generation device 20 according to the second variation will be described.

When the functional components are realized by hardware, the key generation device 20 includes an electronic circuit 25 in place of the processor 21, the memory 22, and the storage 23. The electronic circuit 25 is a dedicated circuit that realizes the functions of the functional components, the memory 22, and the storage 23.

Figure 12:
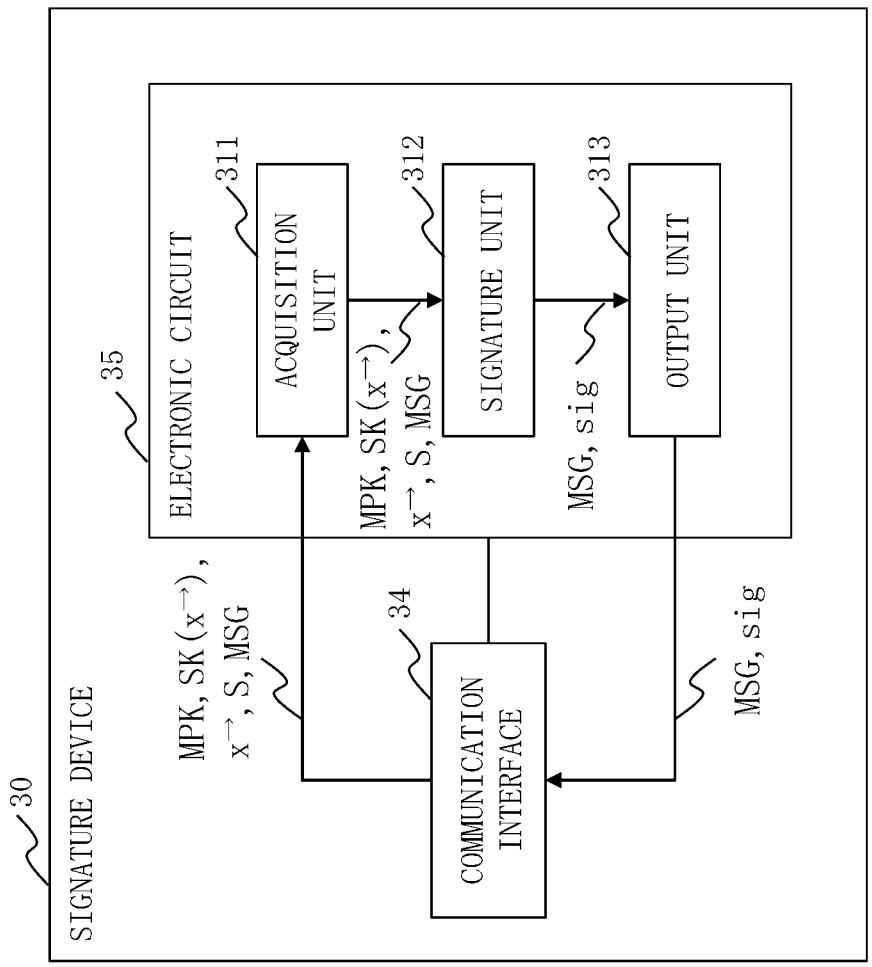
FIG. 12 is a configuration diagram of the signature device 30 according to the second variation.

Referring to FIG. 12, a configuration of the signature device 30 according to the second variation will be described.

When the functional components are realized by hardware, the signature device 30 includes an electronic circuit 35 in place of the processor 31, the memory 32, and the storage 33. The electronic circuit 35 is a dedicated circuit that realizes the functions of the functional components, the memory 32, and the storage 33.

Figure 13:
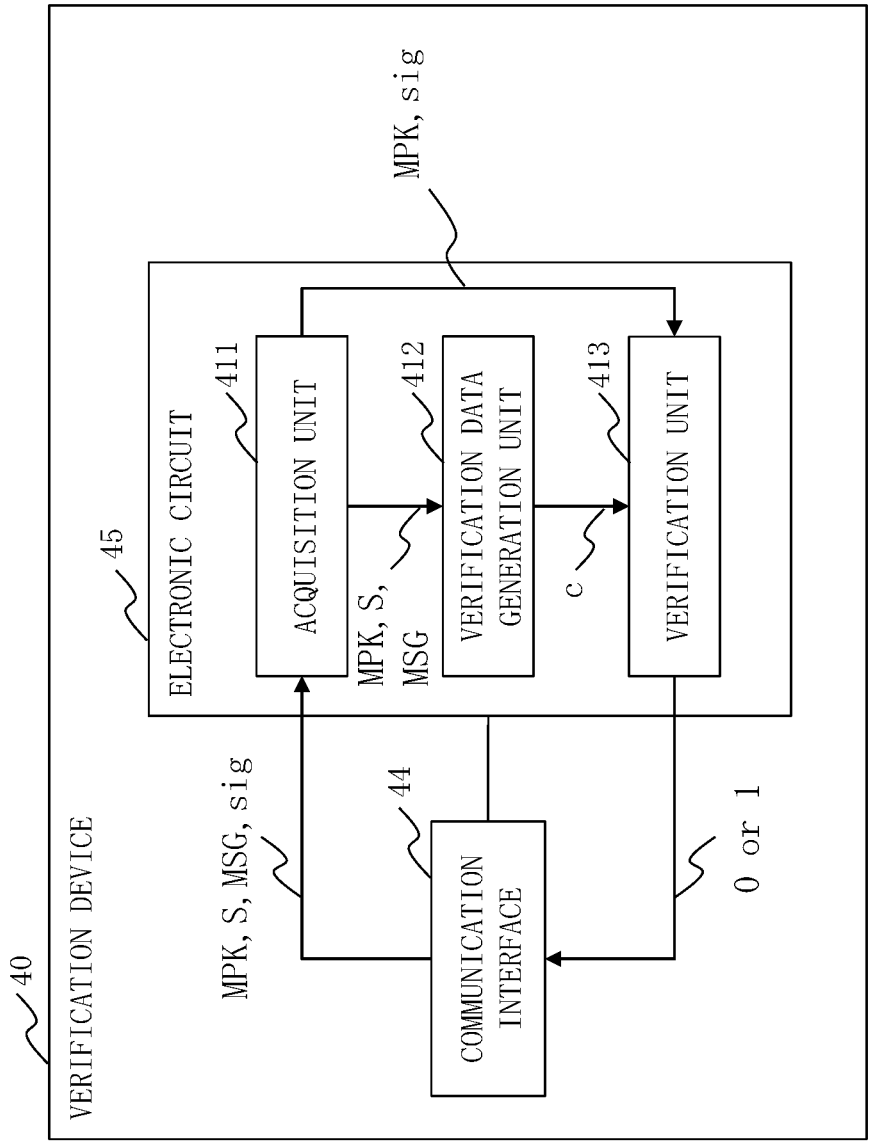
FIG. 13 is a configuration diagram of the verification device 40 according to the second variation.

Referring to FIG. 13, a configuration of the verification device 40 according to the second variation will be described.

When the functional components are realized by hardware, the verification device 40 includes an electronic circuit 45 in place of the processor 41, the memory 42, and the storage 43. The electronic circuit 45 is a dedicated circuit that realizes the functions of the functional components, the memory 42, and the storage 43.

Each of the electronic circuits 15, 25, 35, and 45 is assumed to be a single circuit, a composite circuit, a programmed processor, a parallel-programmed processor, a logic IC, a gate array (GA), an application specific integrated circuit (ASIC), or a field-programmable gate array (FPGA).

The respective functional components may be realized by one electronic circuit 15, one electronic circuit 25, one electronic circuit 35, and one electronic circuit 45, or the respective functional components may be distributed among and realized by a plurality of electronic circuits 15, a plurality of electronic circuits 25, a plurality of electronic circuits 35, and a plurality of electronic circuits 45.

<Third Variation>

As a third variation, some of the functional components may be realized by hardware, and the rest of the functional components may be realized by software.

Each of the processors 11, 21, 31, 41, the memories 12, 22, 32, 42, the storages 13, 23, 33, 43, and the electronic circuits 15, 25, 35, 45 is also referred to as processing circuitry. That is, the functions of the functional components are realized by the processing circuitry.

REFERENCE SIGNS LIST

10: setup device, 11: processor, 12: memory, 13: storage, 14: communication interface, 15: electronic circuit, 111: acceptance unit, 112: master key generation unit, 113: output unit, 20: key generation device, 21: processor, 22: memory, 23: storage, 24: communication interface, 25: electronic circuit, 211: acquisition unit, 212: signature key generation unit, 213: output unit, 30: signature device, 31: processor, 32: memory, 33: storage, 34: communication interface, 35: electronic circuit, 311: acquisition unit, 312: signature unit, 313: output unit, 40: verification device, 41: processor, 42: memory, 43: storage, 44: communication interface, 45: electronic circuit, 1: signature system

The invention claimed is:

1. A signature device comprising:
processing circuitry to:
acquire a signature key in which an attribute vector is set over a basis B* of a basis B and the basis B*, which are dual bases in dual vector spaces,
generate a signature for a message by setting predicate information of arithmetic branching programs (ABP) for the acquired signature key, and
output the generated signature and the message,
wherein the signature key includes elements respectively corresponding to elements of the attribute vector, and in each of the element of the signature key, index information I* associated with a corresponding one of the elements of the attribute vector is set as a coefficient of one or more but not all basis vectors in the basis B*.

2. The signature device according to claim 1,
wherein the predicate information is obtained from an arithmetic span program (ASP) representation corresponding to the ABP.

3. The signature device according to claim 2,
wherein the predicate information includes an element $\Omega_j$ indicated in Formula 1, and
wherein the processing circuitry conceals an element of the attribute vector by the element $\Omega_j$ $$\vec{e}^{(L,L)} = \sum_{j \in [m]} \Omega_j \left( x_{\rho(j)} \vec{y}^{(j)} + \vec{z}^{(j)} \right) \quad \text{[Formula 1]}$$

where $$\vec{e}^{(d,i)} = (\overbrace{0, \ldots, 0}^{i-1}, 1, \overbrace{0, \ldots, 0}^{d-i}) \text{ for } i \in [d],$$

d is an integer of 1 or more,
$\mathbb{S}$ is an access structure expressed as an ASP representation, $$\mathbb{S} = (\mathcal{U} = \{\vec{y}^{(j)}, \vec{z}^{(j)}\}_{j \in [m]} \subset (\mathbb{F}_q^L)^2, \rho:[M] \to [N]),$$

n is the number of elements in an attribute vector, and
m,L are integers of 1 or more.

4. The signature device according to claim 3,
wherein the predicate information includes an element $\Omega'_j$ and an element $\Omega''_j$ indicated in Formula 2, and
wherein the processing circuitry conceals an element of the attribute vector and the element $\Omega_j$ by the element $\Omega'_j$ and the element $\Omega''_j$ $$\left( (\Omega'_j)_{j \in [m]}, (\Omega''_j)_{j \in [m]} \right) \xleftarrow{U} (\mathbb{F}_q^m)^2 \quad \text{[Formula 2]}$$

such that $\sum_{j \in [m]} \left( \Omega'_j \vec{y}^{(j)} + \Omega''_j \vec{z}^{(j)} \right) = \vec{0}^L$.

5. The signature device according to claim 4,
wherein the signature is sig indicated in Formula 3

$$sig = \left( s^{*(0)}, \ldots, s^{*(m+1)} \right) \quad \text{[Formula 3]}$$

where $s^{*(0)} = \xi k^{*(0)} + r^{*(0)}$, $s^{*(j)} = \xi \Omega_j k^{*(\rho(j))} + \sigma'_j \left( b^{*(1,1)} + \rho(j) b^{*(1,2)} \right) +$
$\qquad \Omega''_j b^{*(1,3)} + \Omega'_j b^{*(1,4)} + r^{*(j)}$ for $j \in [m]$, $s^{*(m+1)} = \xi \left( k^{*(n+1,1)} + H(MSG \| \mathbb{S}) k^{*(n+1,2)} \right) + r^{*(m+1)}$, $\xi, \sigma'_j \xleftarrow{U} \mathbb{F}_q$, $r^{*(0)} \xleftarrow{U} SPAN\langle b^{*(0,3)} \rangle, r^{*(j)} \xleftarrow{U} SPAN\langle b^{*(1,11)}, b^{*(1,12)} \rangle$, $r^{*(m+1)} \xleftarrow{U} SPAN\langle b^{*(2,5)}, b^{*(2,6)} \rangle$, $k^{*(0)}, \ldots, k^{*(n)}, k^{*(n+1,1)}$, $\qquad k^{*(n+1,2)}$ are elements of a signature key, $k^{*(0)} = (\omega, 0, \phi_0, 0)_{\mathbb{B}_0^*}$, $k^{*(\iota)} = \left( \sigma_\iota(1, t), \omega(1, x_\iota), \vec{0}^6, \vec{\phi}^{(\iota)}, \vec{0}^2 \right)_{\mathbb{B}_1^*}$, $k^{*(n+1,1)} = \left( \omega(1, 0), \vec{0}^2, \vec{\phi}^{(n+1,1)}, \vec{0}^2 \right)_{\mathbb{B}_2^*}$ for $\iota \in [n]$, -continued $k^{*(n+1,2)} = \left( \omega(1, 0), \vec{0}^2, \vec{\phi}^{(n+1,2)}, \vec{0}^2 \right)_{\mathbb{B}_2^*}$, $\omega \xleftarrow{U} \mathbb{F}_q \setminus \{0\}, \phi_0 \xleftarrow{U} \mathbb{F}_q$, for $\iota \in [n] \sigma_\iota \xleftarrow{U} \mathbb{F}_q \setminus \{0\}, \vec{\phi}^{(\iota)}, \vec{\phi}^{(n+1,1)}, \vec{\phi}^{(n+1,2)} \xleftarrow{U} \mathbb{F}_q^2$, H is a hash function, MSG is a message, and b* is a basis vector of a basis B*.

6. A verification device comprising:
processing circuitry to:
acquire a signature in which an attribute vector and predicate information of arithmetic branching programs (ABP) are set over a basis B* of a basis B and the basis B*, which are dual bases in dual vector spaces, and
verify the signature by performing a pairing operation on the acquired signature and verification data in which verification information is set over the basis B,
wherein the signature includes elements respectively corresponding to elements of the attribute vector, and in each of the elements of the signature, index information I* associated with a corresponding one of the elements of the attribute vector is set as a coefficient of one or more but not all basis vectors in the basis B*, and
wherein the verification data includes one or more elements corresponding to one or more elements of the attribute vector, and in each element of the verification data, index information I is set as a coefficient of each basis vector in the basis B corresponding to the one or more but not all basis vectors, the index information I being such that a sum of inner products of the index information I and the index information I* becomes 0.

7. The verification device according to claim 6,
wherein the predicate information and the verification information are obtained from an arithmetic span program (ASP) representation corresponding to the ABP.

8. The verification device according to claim 7,
wherein the predicate information includes $\Omega_j$ indicated in Formula 4

[Formula 4]

$$\vec{e}^{(L,L)} = \sum_{j \in [m]} \Omega_j \left( x_{\rho(j)} \vec{y}^{(j)} + \vec{z}^{(j)} \right) \quad \text{[Formula 4]}$$

where $$\vec{e}^{(d,i)} = (\overbrace{0, \ldots, 0}^{i-1}, 1, \overbrace{0, \ldots, 0}^{d-i}) \text{ for } i \in [d],$$

d is an integer of 1 or more,
$\mathbb{S}$ is an access structure expressed as an ASP representation, $$\mathbb{S} = (\mathcal{U} = \{\vec{y}^{(j)}, \vec{z}^{(j)}\}_{j \in [m]} \subset (\mathbb{F}_q^L)^2, \rho:[M] \to [N]),$$

n is the number of elements in an attribute vector, and
m,L are integers of 1 or more.

9. The verification device according to claim 8, wherein the signature is sig indicated in Formula 5, and wherein the verification data is c indicated in formula 6

$$sig = \left(s^{*(0)}, \ldots, s^{*(m+1)}\right) \quad \text{[Formula 5]}$$

where $$s^{*(0)} = \xi k^{*(0)} + r^{*(0)},$$

$$s^{*(j)} = \xi \Omega_j k^{*(\rho(j))} +$$

$$\sigma'_j\left(b^{*(1,1)} + \rho(j)b^{*(1,2)}\right) + \Omega''_j b^{*(1,3)} + \Omega'_j b^{*(1,4)} + r^{*(j)} \text{ for } j \in [m],$$

$$s^{*(m+1)} = \xi\left(k^{*(n+1,1)} + H(MSG\|\$)k^{*(n+1,2)}\right) + r^{*(m+1)},$$

$$\xi, \sigma'_j \xleftarrow{U} \mathbb{F}_q,$$

$$r^{*(0)} \xleftarrow{U} \text{SPAN}\langle b^{*(0,3)}\rangle, r^{*(j)} \xleftarrow{U} \text{SPAN}\langle b^{*(1,11)}, b^{*(1,12)}\rangle,$$

$$r^{*(m+1)} \xleftarrow{U} \text{SPAN}\langle b^{*(2,5)}, b^{*(2,6)}\rangle,$$

$$\left((\Omega'_j)_{j \in [m]}, (\Omega''_j)_{j \in [m]}\right) \xleftarrow{U} (\mathbb{F}_q^m)^2$$

such that $\sum_{j \in [m]}\left(\Omega'_j \vec{y}^{(j)} + \Omega''_j \vec{z}^{(j)}\right) = \vec{0}^L,$ $k^{*(0)}, \ldots, k^{*(n)}, k^{*(n+1,1)}, k^{*(n+1,2)}$ are elements of a signature key, $$k^{*(0)} = (\omega, 0, \phi_0, 0)_{\mathbb{B}_0^*},$$

$$k^{*(\iota)} = \left(\sigma_\iota(1, \iota), \omega(1, x_\iota), \vec{0}^6, \vec{\phi}^{(\iota)}, \vec{0}^2\right)_{\mathbb{B}_1^*},$$

$$k^{*(n+1,1)} = \left(\omega(1, 0), \vec{0}^2, \vec{\phi}^{(n+1,1)}, \vec{0}^2\right)_{\mathbb{B}_2^*} \text{ for } \iota \in [n],$$

$$k^{*(n+1,2)} = \left(\omega(1, 0), \vec{0}^2, \vec{\phi}^{(n+1,2)}, \vec{0}^2\right)_{\mathbb{B}_2^*},$$

$$\omega \xleftarrow{U} \mathbb{F}_q \setminus \{0\}, \phi_0 \xleftarrow{U} \mathbb{F}_q,$$

$$\text{for } \iota \in [n]\sigma_\iota \xleftarrow{U} \mathbb{F}_q \setminus \{0\}, \vec{\phi}^{(\iota)}, \vec{\phi}^{(n+1,1)}, \vec{\phi}^{(n+1,2)} \xleftarrow{U} \mathbb{F}_q^2,$$

$H$ is a hash function, $MSG$ is a message, and, $b^*$ is a basis vector of a basis $B^*$ $$c = \left(c^{(0)}, \ldots, c^{(m+1)}\right) \quad \text{[Formula 6]}$$

where $$c^{(0)} = (-u - u_L, 0, 0, \eta_0)_{\mathbb{B}_0}$$

$$c^{(j)} = \left(\mu_j(\rho(j), -1), (s'_j, s_j), \vec{0}^6, \vec{0}^2, \vec{\eta}^{(j)}\right)_{\mathbb{B}_1} \text{ for } j \in [m]$$

$$c^{(m+1)} = \left((u - \kappa H(MSG\|\$), \kappa), \vec{0}^2, \vec{0}^2, \vec{\eta}^{(m+1)}\right)_{\mathbb{B}_2}$$

$$\vec{u} = (u_1, \ldots, u_L) \xleftarrow{U} \mathbb{F}_q^L,$$

for $j \in [m] s_j = \vec{u} \cdot \vec{y}^{(j)}, s'_j = \vec{u} \cdot \vec{z}^{(j)},$ $u, \eta_0, \kappa \xleftarrow{U} \mathbb{F}_q, \mu_j \xleftarrow{U} \mathbb{F}_d$ for $j \in [m],$ $$\vec{\eta}^{(j)}, \vec{\eta}^{(m+1)} \xleftarrow{U} \mathbb{F}_q^2.$$

10. A signature method comprising:
acquiring a signature key in which an attribute vector is set over a basis B* of a basis B and the basis B*, which are dual bases in dual vector spaces;
generating a signature for a message by setting predicate information of arithmetic branching programs (ABP) for the signature key; and
outputting the signature and the message,
wherein the signature key includes elements respectively corresponding to elements of the attribute vector, and in each of the element of the signature key, index information I* associated with a corresponding one of the elements of the attribute vector is set as a coefficient of one or more but not all basis vectors in the basis B*.

11. A non-transitory computer readable medium storing a signature program that causes a computer to function as a signature device to perform:
an acquisition process of acquiring a signature key in which an attribute vector is set over a basis B* of a basis B and the basis B*, which are dual bases in dual vector spaces;
a signature process of generating a signature for a message by setting predicate information of arithmetic branching programs (ABP) for the signature key acquired by the acquisition process; and
an output process of outputting the signature generated by the signature process and the message,
wherein the signature key includes elements respectively corresponding to elements of the attribute vector, and in each of the element of the signature key, index information I* associated with a corresponding one of the elements of the attribute vector is set as a coefficient of one or more but not all basis vectors in the basis B*.

12. A verification method comprising:
acquiring a signature in which an attribute vector and predicate information of arithmetic branching programs (ABP) are set over a basis B* of a basis B and the basis B*, which are dual bases in dual vector spaces; and
verifying the signature by performing a pairing operation on the signature and verification data in which verification information is set over the basis B,
wherein the signature includes elements respectively corresponding to elements of the attribute vector, and in each of the elements of the signature, index information I* associated with a corresponding one of the elements of the attribute vector is set as a coefficient of one or more but not all basis vectors in the basis B*, and
wherein the verification data includes one or more elements corresponding to one or more elements of the attribute vector, and in each element of the verification data, index information I is set as a coefficient of each basis vector in the basis B corresponding to the one or more but not all basis vectors, the index information I being such that a sum of inner products of the index information I and the index information I* becomes 0.

13. A non-transitory computer readable medium storing a verification program that causes a computer to function as a verification device to perform:
an acquisition process of acquiring a signature in which an attribute vector and predicate information of arithmetic branching programs (ABP) are set over a basis B* of a basis B and the basis B*, which are dual bases in dual vector spaces; and
a verification process of verifying the signature by performing a pairing operation on the signature acquired by the acquisition process and verification data in which verification information is set over the basis B,
wherein the signature includes elements respectively corresponding to elements of the attribute vector, and in each of the elements of the signature, index information I* associated with a corresponding one of the elements of the attribute vector is set as a coefficient of one or more but not all basis vectors in the basis B*, and
wherein the verification data includes one or more elements corresponding to one or more elements of the attribute vector, and in each element of the verification data, index information I is set as a coefficient of each basis vector in the basis B corresponding to the one or more but not all basis vectors, the index information I being such that a sum of inner products of the index information I and the index information I* becomes 0.

* * * * *